United States Patent
Iourcha et al.

(10) Patent No.: US 12,080,032 B2
(45) Date of Patent: Sep. 3, 2024

(54) REAL TIME ON-CHIP TEXTURE DECOMPRESSION USING SHADER PROCESSORS

(71) Applicant: Advanced Micro Devices, Inc., Santa Clara, CA (US)

(72) Inventors: Konstantine Iourcha, Santa Clara, CA (US); John W. Brothers, Calistoga, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 135 days.

(21) Appl. No.: 17/352,809

(22) Filed: Jun. 21, 2021

(65) Prior Publication Data

US 2021/0312668 A1   Oct. 7, 2021

Related U.S. Application Data

(63) Continuation of application No. 16/709,462, filed on Dec. 10, 2019, now Pat. No. 11,043,010, which is a
(Continued)

(51) Int. Cl.
*G06T 9/00* (2006.01)
*G06T 1/20* (2006.01)
(Continued)

(52) U.S. Cl.
CPC .................. *G06T 9/00* (2013.01); *G06T 1/20* (2013.01); *G06T 15/005* (2013.01);
(Continued)

(58) Field of Classification Search
CPC . G06T 9/00; G06T 1/20; G06T 15/005; G06F 12/0875; G06F 12/109;
(Continued)

(56) References Cited

U.S. PATENT DOCUMENTS 5,191,548 A   3/1993   Balkanski et al.
5,237,460 A   8/1993   Miller et al.
(Continued)

FOREIGN PATENT DOCUMENTS

CN   101072349 A   11/2007
CN   101425175 A   5/2009
(Continued)

OTHER PUBLICATIONS

Akenine-Moller, et al., "Graphics Processing Units for Handhelds", Proceedings of the IEEE, May 2008, pp. 779-789, vol. 96, Issue 5, IEEE, New York, NY, USA.
(Continued)

*Primary Examiner* — Charles L Beard
(74) *Attorney, Agent, or Firm* — Kowert, Hood, Munyon, Rankin & Goetzel, P.C.; Rory D. Rankin

(57) ABSTRACT

A processing unit, method, and medium for decompressing or generating textures within a graphics processing unit (GPU). The textures are compressed with a variable-rate compression scheme such as JPEG. The compressed textures are retrieved from system memory and transferred to local cache memory on the GPU without first being decompressed. A table is utilized by the cache to locate individual blocks within the compressed texture. A decompressing shader processor receives compressed blocks and then performs on-the-fly decompression of the blocks. The decompressed blocks are then processed as usual by a texture consuming shader processor of the GPU.

20 Claims, 7 Drawing Sheets

Related U.S. Application Data continuation of application No. 15/181,130, filed on Jun. 13, 2016, now Pat. No. 10,510,164, which is a continuation of application No. 13/163,071, filed on Jun. 17, 2011, now Pat. No. 9,378,560.

(51) Int. Cl.
  *G06T 15/00* (2011.01)
  *G06F 12/0875* (2016.01)
  *G06F 12/109* (2016.01)

(52) U.S. Cl.
  CPC ........ *G06F 12/0875* (2013.01); *G06F 12/109* (2013.01); *G06F 2212/401* (2013.01); *G06F 2212/455* (2013.01); *G06F 2212/657* (2013.01)

(58) Field of Classification Search
  CPC ......... G06F 2212/401; G06F 2212/455; G06F 2212/657
  See application file for complete search history.

(56) References Cited

U.S. PATENT DOCUMENTS

| | | | |
|---|---|---|---|
| 5,313,577 A | 5/1994 | Meinerth et al. | |
| 5,548,751 A | 8/1996 | Ryu et al. | |
| 5,649,151 A | 7/1997 | Chu et al. | |
| 5,696,926 A | 12/1997 | Culbert et al. | |
| 5,696,927 A | 12/1997 | MacDonald et al. | |
| 5,699,539 A | 12/1997 | Garber et al. | |
| 5,729,668 A | 3/1998 | Claflin et al. | |
| 5,768,481 A | 6/1998 | Chan et al. | |
| 5,812,817 A * | 9/1998 | Hovis .................. | G06F 12/023 710/68 |
| 5,900,022 A | 5/1999 | Kranich | |
| 5,936,616 A | 8/1999 | Torborg, Jr. et al. | |
| 5,940,871 A | 8/1999 | Goyal et al. | |
| 5,946,716 A | 8/1999 | Karp et al. | |
| 6,002,411 A | 12/1999 | Dye | |
| 6,008,820 A | 12/1999 | Chauvin et al. | |
| 6,032,197 A | 2/2000 | Birdwell et al. | |
| 6,049,390 A | 4/2000 | Notredame et al. | |
| 6,088,780 A | 7/2000 | Yamada et al. | |
| 6,092,171 A * | 7/2000 | Relph .................... | G06K 15/00 358/1.15 |
| 6,108,460 A | 8/2000 | Rich | |
| 6,111,585 A | 8/2000 | Choi | |
| 6,115,787 A | 9/2000 | Obara | |
| 6,154,216 A | 11/2000 | Walton | |
| 6,157,743 A * | 12/2000 | Goris .................... | G06T 1/60 382/233 |
| 6,173,381 B1 | 1/2001 | Dye | |
| 6,184,997 B1 | 2/2001 | Hanyu et al. | |
| 6,192,051 B1 | 2/2001 | Lipman et al. | |
| 6,199,126 B1 * | 3/2001 | Auerbach ........... | G06F 9/30178 712/E9.055 |
| 6,229,926 B1 | 5/2001 | Chui et al. | |
| 6,243,081 B1 * | 6/2001 | Goris .................... | G06T 1/60 345/582 |
| 6,266,753 B1 | 7/2001 | Hicok et al. | |
| 6,279,092 B1 * | 8/2001 | Franaszek .......... | G06F 12/0802 711/170 |
| 6,307,557 B1 | 10/2001 | Deering | |
| 6,313,767 B1 | 11/2001 | Ishizuka et al. | |
| 6,349,372 B1 * | 2/2002 | Benveniste ............. | G06F 12/08 711/159 |
| 6,349,375 B1 * | 2/2002 | Faulkner ................ | G06F 12/08 711/170 |
| 6,349,379 B2 | 2/2002 | Gibson et al. | |
| 6,362,824 B1 | 3/2002 | Thayer | |
| 6,366,289 B1 * | 4/2002 | Johns ..................... | G09G 5/39 345/543 |
| 6,446,189 B1 | 9/2002 | Zuraski, Jr. et al. | |
| 6,452,602 B1 * | 9/2002 | Morein ................ | H04N 19/176 375/E7.137 |
| 6,515,673 B1 | 2/2003 | Hashimoto et al. | |
| 6,525,722 B1 | 2/2003 | Deering | |
| 6,553,457 B1 * | 4/2003 | Wilkins ............... | G06F 12/0873 711/E12.019 |
| 6,557,083 B1 | 4/2003 | Sperber et al. | |
| 6,618,440 B1 * | 9/2003 | Taunton ............... | H04N 19/433 375/E7.102 |
| 6,630,933 B1 * | 10/2003 | Van Hook ............... | G06T 9/001 345/422 |
| 6,728,722 B1 | 4/2004 | Shaylor | |
| 6,779,088 B1 | 8/2004 | Benveniste et al. | |
| 6,779,100 B1 | 8/2004 | Keltcher et al. | |
| 6,807,285 B1 | 10/2004 | Iwamura | |
| 6,853,385 B1 | 2/2005 | MacInnis et al. | |
| 6,854,050 B1 | 2/2005 | Zuraski, Jr. | |
| 6,897,858 B1 | 5/2005 | Hashimoto et al. | |
| 6,920,331 B1 | 7/2005 | Sim et al. | |
| 6,947,944 B1 | 9/2005 | Furuike | |
| 6,959,110 B1 | 10/2005 | Danskin et al. | |
| 6,968,424 B1 * | 11/2005 | Danilak ............... | G06F 12/0866 711/170 |
| 6,972,769 B1 | 12/2005 | Nebeker et al. | |
| 6,973,562 B1 * | 12/2005 | McGrath ............. | G06F 9/30189 712/E9.035 |
| 7,039,241 B1 * | 5/2006 | Van Hook .................. | G06T 9/00 382/232 |
| 7,050,639 B1 | 5/2006 | Barnes et al. | |
| 7,068,192 B1 | 6/2006 | Dean et al. | |
| 7,079,698 B2 | 7/2006 | Kobayashi | |
| 7,158,990 B1 | 1/2007 | Guo et al. | |
| 7,171,051 B1 * | 1/2007 | Moreton .................... | G06T 9/00 382/233 |
| 7,190,284 B1 * | 3/2007 | Dye ....................... | G06F 12/023 711/170 |
| 7,302,543 B2 | 11/2007 | Lekatsas et al. | |
| 7,324,113 B1 | 1/2008 | Rouet et al. | |
| 7,339,590 B1 | 3/2008 | Moskal et al. | |
| 7,375,660 B1 | 5/2008 | Chang et al. | |
| 7,382,368 B1 | 6/2008 | Molnar et al. | |
| 7,385,611 B1 * | 6/2008 | Toksvig ............... | H04N 19/21 345/582 |
| 7,512,616 B2 * | 3/2009 | Corcoran ............. | G06F 9/4401 717/136 |
| 7,526,607 B1 | 4/2009 | Singh et al. | |
| 7,545,382 B1 | 6/2009 | Montrym et al. | |
| 7,565,018 B2 | 7/2009 | Srinivasan | |
| 7,587,572 B1 | 9/2009 | Stenstrom | |
| 7,599,975 B1 * | 10/2009 | Donovan ............... | H03M 7/14 708/203 |
| 7,617,382 B1 | 11/2009 | Toll et al. | |
| 7,620,953 B1 | 11/2009 | Tene et al. | |
| 7,626,521 B2 | 12/2009 | Hussain et al. | |
| 7,656,326 B2 | 2/2010 | Hussain et al. | |
| 7,669,202 B1 | 2/2010 | Tene et al. | |
| 7,681,013 B1 * | 3/2010 | Trivedi ............... | G06F 9/30032 712/7 |
| 7,702,875 B1 * | 4/2010 | Ekman .................... | G06F 12/08 711/170 |
| 7,742,646 B1 | 6/2010 | Donovan | |
| 7,840,786 B2 * | 11/2010 | Suggs .................. | G06F 9/3017 712/213 |
| 7,848,430 B2 | 12/2010 | Valmiki et al. | |
| 7,877,565 B1 | 1/2011 | Allen et al. | |
| 7,885,469 B2 | 2/2011 | Wang et al. | |
| 7,886,116 B1 * | 2/2011 | Everitt ................ | G06F 9/30043 707/693 |
| 7,920,749 B1 * | 4/2011 | Donovan .............. | H04N 19/105 382/233 |
| 7,932,912 B1 | 4/2011 | Van Dyke | |
| 7,932,914 B1 * | 4/2011 | Geiss ..................... | G09G 5/393 345/614 |
| 7,944,452 B1 | 5/2011 | Wietkemper et al. | |
| 7,965,773 B1 | 6/2011 | Schlanger et al. | |
| 7,991,049 B2 | 8/2011 | MacInnis et al. | |
| 7,999,820 B1 * | 8/2011 | Weitkemper .......... | G09G 5/39 345/568 |
| 8,023,752 B1 | 9/2011 | Donovan et al. | |

(56) References Cited

U.S. PATENT DOCUMENTS

| | | | |
|---|---|---|---|
| 8,040,351 B1* | 10/2011 | Diard | G06T 7/13 |
| | | | 382/167 |
| 8,065,354 B1 | 11/2011 | Donovan et al. | |
| 8,094,158 B1* | 1/2012 | Allen | G06F 9/3851 |
| | | | 345/545 |
| 8,184,710 B2 | 5/2012 | Srinivasan et al. | |
| 8,243,086 B1 | 8/2012 | Diard | |
| 8,254,701 B1 | 8/2012 | Diard | |
| 8,271,734 B1* | 9/2012 | Glasco | G06F 12/084 |
| | | | 345/546 |
| 8,295,621 B1* | 10/2012 | Diard | G06T 11/40 |
| | | | 382/250 |
| 8,311,091 B1 | 11/2012 | Lin et al. | |
| 8,421,794 B2 | 4/2013 | Du et al. | |
| 8,441,487 B1 | 5/2013 | Everitt | |
| 8,504,744 B2 | 8/2013 | Khawer et al. | |
| 8,542,243 B2 | 9/2013 | Rogers | |
| 8,595,437 B1 | 11/2013 | Glasco et al. | |
| 8,619,800 B1 | 12/2013 | Finney et al. | |
| 8,631,055 B2 | 1/2014 | Wegener | |
| 8,655,062 B2 | 2/2014 | Kuo et al. | |
| 8,661,496 B2 | 2/2014 | Perlman et al. | |
| 8,687,702 B2 | 4/2014 | Schmit | |
| 8,700,865 B1 | 4/2014 | Van Dyke et al. | |
| 8,941,655 B2 | 1/2015 | Nordlund et al. | |
| 8,958,481 B2* | 2/2015 | Lin | H04N 19/129 |
| | | | 375/240.18 |
| 8,982,655 B1 | 3/2015 | Henry et al. | |
| 9,013,473 B2 | 4/2015 | Ahn et al. | |
| 9,024,957 B1 | 5/2015 | Mahan et al. | |
| 9,024,959 B2 | 5/2015 | Duprat et al. | |
| 9,047,686 B2* | 6/2015 | Sharp | G06F 3/064 |
| 9,159,114 B2 | 10/2015 | Dewangan et al. | |
| 9,213,640 B2 | 12/2015 | Kaplan et al. | |
| 9,218,689 B1* | 12/2015 | Baldwin | G06T 7/60 |
| 9,258,013 B1 | 2/2016 | Chau et al. | |
| 9,274,951 B2 | 3/2016 | Evans et al. | |
| 9,319,063 B2 | 4/2016 | Wegener | |
| 9,378,560 B2 | 6/2016 | Iourcha et al. | |
| 9,407,920 B2* | 8/2016 | Guo | H04N 19/426 |
| 9,419,648 B1 | 8/2016 | Guilford et al. | |
| 9,477,605 B2* | 10/2016 | Loh | G06F 12/0866 |
| 9,536,275 B1* | 1/2017 | Diard | G06T 15/80 |
| 9,537,504 B1 | 1/2017 | Guilford et al. | |
| 9,547,747 B2 | 1/2017 | Fan et al. | |
| 9,569,348 B1 | 2/2017 | Deming et al. | |
| 9,582,428 B2 | 2/2017 | Henry et al. | |
| 9,606,961 B2 | 3/2017 | Uliel et al. | |
| 9,665,490 B2* | 5/2017 | Henry | G06F 9/4403 |
| 9,690,511 B2 | 6/2017 | Henry et al. | |
| 9,697,219 B1 | 7/2017 | Wang et al. | |
| 9,699,470 B2 | 7/2017 | Fenney | |
| 9,720,617 B2 | 8/2017 | Myrick et al. | |
| 9,734,598 B2 | 8/2017 | Grossman | |
| 9,760,439 B2 | 9/2017 | Anderson | |
| 9,767,529 B1 | 9/2017 | Liu et al. | |
| 9,779,023 B1* | 10/2017 | Armangau | G06F 12/0875 |
| 9,880,842 B2 | 1/2018 | Bobba et al. | |
| 9,912,957 B1* | 3/2018 | Surti | H04N 19/85 |
| 9,928,642 B2* | 3/2018 | Diard | G06T 15/80 |
| 10,140,033 B2 | 11/2018 | Amidi et al. | |
| 10,171,219 B2 | 1/2019 | Fan et al. | |
| 10,236,971 B2 | 3/2019 | Ui et al. | |
| 10,298,684 B2 | 5/2019 | Baptist et al. | |
| 10,366,026 B1* | 7/2019 | Diamant | G06F 12/023 |
| 10,510,164 B2 | 12/2019 | Iourcha et al. | |
| 10,572,378 B2* | 2/2020 | Li | G06F 12/0893 |
| 10,901,948 B2* | 1/2021 | Ackerman | G06F 16/1744 |
| 11,043,010 B2 | 6/2021 | Iourcha et al. | |
| 11,050,436 B2* | 6/2021 | Lasch | H03M 7/3097 |
| 11,550,600 B2* | 1/2023 | Xu | G06N 3/063 |
| 2001/0050955 A1 | 12/2001 | Zhang et al. | |
| 2001/0054131 A1 | 12/2001 | Alvarez, II et al. | |
| 2002/0042862 A1 | 4/2002 | Breternitz, Jr. et al. | |
| 2002/0049586 A1 | 4/2002 | Nishio et al. | |
| 2002/0099907 A1 | 7/2002 | Castelli et al. | |
| 2003/0053115 A1 | 3/2003 | Shoda et al. | |
| 2003/0088715 A1 | 5/2003 | Chaudhuri et al. | |
| 2003/0095596 A1 | 5/2003 | Shimizu | |
| 2003/0112869 A1 | 6/2003 | Chen et al. | |
| 2003/0117585 A1 | 6/2003 | Lee | |
| 2003/0135694 A1 | 7/2003 | Naffziger et al. | |
| 2003/0161542 A1 | 8/2003 | Ridge | |
| 2003/0169935 A1* | 9/2003 | Sano | G06T 3/4084 |
| | | | 382/233 |
| 2003/0185305 A1 | 10/2003 | MacInnis et al. | |
| 2003/0191903 A1 | 10/2003 | Sperber et al. | |
| 2003/0202607 A1 | 10/2003 | Srinivasan | |
| 2003/0217237 A1 | 11/2003 | Benveniste et al. | |
| 2003/0225981 A1 | 12/2003 | Castelli et al. | |
| 2004/0008790 A1 | 1/2004 | Rodriguez | |
| 2004/0015660 A1 | 1/2004 | Benveniste et al. | |
| 2004/0028141 A1 | 2/2004 | Hsiun et al. | |
| 2004/0046765 A1 | 3/2004 | Lefebvre et al. | |
| 2004/0054953 A1* | 3/2004 | Mitchell | G06F 12/0875 |
| | | | 714/748 |
| 2004/0091160 A1 | 5/2004 | Hook et al. | |
| 2004/0111710 A1 | 6/2004 | Chakradhar et al. | |
| 2004/0117578 A1* | 6/2004 | Castelli | G06F 12/08 |
| | | | 711/170 |
| 2004/0141655 A1 | 7/2004 | Aoyagi | |
| 2004/0221128 A1 | 11/2004 | Beecroft et al. | |
| 2004/0228527 A1 | 11/2004 | Iourcha et al. | |
| 2005/0015378 A1 | 1/2005 | Gammel et al. | |
| 2005/0021929 A1 | 1/2005 | Yamada et al. | |
| 2005/0035984 A1 | 2/2005 | Walmsley | |
| 2005/0060421 A1 | 3/2005 | Musunuri et al. | |
| 2005/0093873 A1 | 5/2005 | Paltashev et al. | |
| 2005/0160234 A1 | 7/2005 | Newburn et al. | |
| 2005/0219252 A1 | 10/2005 | Buxton et al. | |
| 2005/0225554 A1 | 10/2005 | Bastos et al. | |
| 2005/0231504 A1 | 10/2005 | Heng et al. | |
| 2005/0237335 A1 | 10/2005 | Koguchi et al. | |
| 2005/0254715 A1 | 11/2005 | Keng et al. | |
| 2005/0278508 A1 | 12/2005 | Vasekin et al. | |
| 2006/0004942 A1 | 1/2006 | Hetherington et al. | |
| 2006/0038822 A1 | 2/2006 | Xu et al. | |
| 2006/0050978 A1 | 3/2006 | Lin et al. | |
| 2006/0053188 A1* | 3/2006 | Mantor | G06F 11/2028 |
| | | | 708/490 |
| 2006/0053189 A1* | 3/2006 | Mantor | G06T 15/005 |
| | | | 708/490 |
| 2006/0072147 A1 | 4/2006 | Kanno | |
| 2006/0092169 A1 | 5/2006 | Wetzel | |
| 2006/0112226 A1 | 5/2006 | Hady et al. | |
| 2006/0114264 A1 | 6/2006 | Weybrew et al. | |
| 2006/0117054 A1 | 6/2006 | Li et al. | |
| 2006/0123184 A1 | 6/2006 | Mondal et al. | |
| 2006/0126962 A1 | 6/2006 | Sun | |
| 2006/0146939 A1 | 7/2006 | Wang | |
| 2006/0176196 A1 | 8/2006 | Sugita | |
| 2006/0250652 A1 | 11/2006 | Silverbrook et al. | |
| 2006/0294312 A1 | 12/2006 | Walmsley | |
| 2007/0005625 A1 | 1/2007 | Lekatsas et al. | |
| 2007/0018979 A1 | 1/2007 | Budagavi | |
| 2007/0033322 A1 | 2/2007 | Zimmer et al. | |
| 2007/0036223 A1 | 2/2007 | Srinivasan | |
| 2007/0083491 A1 | 4/2007 | Walmsley et al. | |
| 2007/0091088 A1 | 4/2007 | Jiao et al. | |
| 2007/0091089 A1 | 4/2007 | Jiao et al. | |
| 2007/0109582 A1 | 5/2007 | Mizuyama | |
| 2007/0147694 A1 | 6/2007 | Chang et al. | |
| 2007/0147787 A1 | 6/2007 | Ogawa et al. | |
| 2007/0157001 A1* | 7/2007 | Ritzau | G06F 12/08 |
| | | | 711/170 |
| 2007/0174588 A1 | 7/2007 | Fuin | |
| 2007/0177205 A1 | 8/2007 | Yamada et al. | |
| 2007/0237391 A1 | 10/2007 | Wu | |
| 2007/0242085 A1 | 10/2007 | Weybrew et al. | |
| 2007/0245097 A1* | 10/2007 | Gschwind | G06F 9/30178 |
| | | | 711/154 |
| 2007/0245119 A1 | 10/2007 | Hoppe | |
| 2007/0257935 A1 | 11/2007 | Koduri et al. | |

(56) References Cited

U.S. PATENT DOCUMENTS

| | | |
|---|---|---|
| 2007/0269115 A1 | 11/2007 | Wang et al. |
| 2007/0279429 A1 | 12/2007 | Ganzer |
| 2007/0280543 A1 | 12/2007 | Matsuhira |
| 2007/0297501 A1 | 12/2007 | Hussain et al. |
| 2008/0002702 A1 | 1/2008 | Bajic et al. |
| 2008/0002896 A1* | 1/2008 | Lu .................. G06T 9/005 |
| | | 382/232 |
| 2008/0019590 A1 | 1/2008 | Arakawa |
| 2008/0027892 A1 | 1/2008 | Carnahan et al. |
| 2008/0044090 A1 | 2/2008 | Wakasa |
| 2008/0055323 A1 | 3/2008 | Franaszek et al. |
| 2008/0059728 A1* | 3/2008 | Daly .................. G06F 12/08 |
| | | 711/158 |
| 2008/0109795 A1 | 5/2008 | Buck et al. |
| 2008/0122665 A1* | 5/2008 | Paris .................. H03M 7/3084 |
| | | 711/E12.072 |
| 2008/0162745 A1 | 7/2008 | Tkacik et al. |
| 2008/0172525 A1 | 7/2008 | Nakamura et al. |
| 2008/0189545 A1 | 8/2008 | Parkinson |
| 2008/0260276 A1 | 10/2008 | Yamatani et al. |
| 2008/0266287 A1 | 10/2008 | Ramey et al. |
| 2008/0266296 A1 | 10/2008 | Ramey et al. |
| 2008/0301256 A1* | 12/2008 | McWilliams ....... G06F 12/0806 |
| | | 714/E11.178 |
| 2008/0301681 A1 | 12/2008 | Sakamoto et al. |
| 2008/0304738 A1 | 12/2008 | Beilloin |
| 2009/0002379 A1 | 1/2009 | Baeza et al. |
| 2009/0003446 A1 | 1/2009 | Wu et al. |
| 2009/0003457 A1 | 1/2009 | Liu et al. |
| 2009/0016603 A1 | 1/2009 | Rossato et al. |
| 2009/0019219 A1 | 1/2009 | Magklis et al. |
| 2009/0021522 A1 | 1/2009 | Burley et al. |
| 2009/0049282 A1 | 2/2009 | Bacon et al. |
| 2009/0051687 A1 | 2/2009 | Kato et al. |
| 2009/0063825 A1 | 3/2009 | McMillen et al. |
| 2009/0077109 A1* | 3/2009 | Paris .................. H03M 7/3084 |
| 2009/0086817 A1 | 4/2009 | Matsuoka et al. |
| 2009/0096642 A1 | 4/2009 | Stein |
| 2009/0119474 A1 | 5/2009 | Anand et al. |
| 2009/0119736 A1 | 5/2009 | Perlman et al. |
| 2009/0128575 A1 | 5/2009 | Liao et al. |
| 2009/0132764 A1 | 5/2009 | Moll et al. |
| 2009/0147017 A1 | 6/2009 | Jiao |
| 2009/0154819 A1 | 6/2009 | Doherty et al. |
| 2009/0160857 A1* | 6/2009 | Rasmusson ............ G06T 15/04 |
| | | 345/422 |
| 2009/0169001 A1 | 7/2009 | Tighe et al. |
| 2009/0182948 A1 | 7/2009 | Jiao et al. |
| 2009/0193042 A1 | 7/2009 | Hornibrook et al. |
| 2009/0204784 A1 | 8/2009 | Favergeon-Borgialli et al. |
| 2009/0219288 A1 | 9/2009 | Heirich |
| 2009/0228635 A1 | 9/2009 | Borkenhagen |
| 2009/0228656 A1 | 9/2009 | Borkenhagen |
| 2009/0228664 A1 | 9/2009 | Borkenhagen |
| 2009/0228668 A1 | 9/2009 | Borkenhagen |
| 2009/0245382 A1 | 10/2009 | Ekman |
| 2009/0251476 A1 | 10/2009 | Jiao et al. |
| 2009/0295804 A1 | 12/2009 | Goel et al. |
| 2009/0304291 A1 | 12/2009 | Boulton |
| 2009/0304298 A1 | 12/2009 | Lu et al. |
| 2009/0305790 A1 | 12/2009 | Lu et al. |
| 2009/0322751 A1 | 12/2009 | Oneppo et al. |
| 2009/0322777 A1 | 12/2009 | Lu et al. |
| 2010/0017578 A1 | 1/2010 | Mansson et al. |
| 2010/0026682 A1 | 2/2010 | Plowman et al. |
| 2010/0045682 A1 | 2/2010 | Ford et al. |
| 2010/0046846 A1 | 2/2010 | Brown |
| 2010/0057750 A1 | 3/2010 | Aasted et al. |
| 2010/0058007 A1 | 3/2010 | Yamauchi |
| 2010/0091018 A1 | 4/2010 | Tatarchuk et al. |
| 2010/0128979 A1 | 5/2010 | Monaghan et al. |
| 2010/0138614 A1 | 6/2010 | Glasco et al. |
| 2010/0141666 A1 | 6/2010 | Christopher et al. |
| 2010/0149192 A1 | 6/2010 | Kota et al. |
| 2010/0166063 A1 | 7/2010 | Perlman et al. |
| 2010/0211827 A1 | 8/2010 | Moyer et al. |
| 2010/0211828 A1 | 8/2010 | Moyer et al. |
| 2010/0254621 A1 | 10/2010 | Wennersten et al. |
| 2010/0281004 A1 | 11/2010 | Kapoor et al. |
| 2010/0302077 A1* | 12/2010 | Abali .................. G06F 12/0804 |
| | | 711/E12.024 |
| 2010/0332786 A1 | 12/2010 | Grohoski et al. |
| 2011/0007976 A1 | 1/2011 | Sugita |
| 2011/0029742 A1 | 2/2011 | Grube et al. |
| 2011/0029761 A1 | 2/2011 | Sung et al. |
| 2011/0050713 A1 | 3/2011 | McCrary et al. |
| 2011/0050716 A1 | 3/2011 | Mantor et al. |
| 2011/0063318 A1 | 3/2011 | Bolz et al. |
| 2011/0071988 A1 | 3/2011 | Resch et al. |
| 2011/0072235 A1 | 3/2011 | Deming et al. |
| 2011/0072321 A1 | 3/2011 | Dhuse |
| 2011/0078222 A1 | 3/2011 | Wegener |
| 2011/0078423 A1 | 3/2011 | Giri et al. |
| 2011/0087840 A1 | 4/2011 | Glasco et al. |
| 2011/0099204 A1 | 4/2011 | Thaler |
| 2011/0107052 A1 | 5/2011 | Narayanasamy |
| 2011/0107057 A1 | 5/2011 | Petolino, Jr. |
| 2011/0115802 A1 | 5/2011 | Mantor et al. |
| 2011/0115806 A1* | 5/2011 | Rogers .................. G06T 9/00 |
| | | 345/582 |
| 2011/0148894 A1* | 6/2011 | Duprat .................. G06T 11/001 |
| | | 345/552 |
| 2011/0150351 A1 | 6/2011 | Singh et al. |
| 2011/0164678 A1 | 7/2011 | Date et al. |
| 2011/0167081 A1 | 7/2011 | Kosaka et al. |
| 2011/0169845 A1 | 7/2011 | Sreenivas et al. |
| 2011/0173476 A1 | 7/2011 | Reed |
| 2011/0211036 A1 | 9/2011 | Tran |
| 2011/0213928 A1 | 9/2011 | Grube et al. |
| 2011/0216069 A1 | 9/2011 | Keall et al. |
| 2011/0221743 A1 | 9/2011 | Keall et al. |
| 2011/0231629 A1 | 9/2011 | Shiraishi |
| 2011/0231722 A1 | 9/2011 | Mukherjee et al. |
| 2011/0242125 A1 | 10/2011 | Hall et al. |
| 2011/0243469 A1 | 10/2011 | McAllister et al. |
| 2011/0267346 A1 | 11/2011 | Howson |
| 2011/0279294 A1 | 11/2011 | Sagar |
| 2011/0285913 A1 | 11/2011 | Astrachan |
| 2011/0310105 A1 | 12/2011 | Koneru et al. |
| 2011/0317766 A1 | 12/2011 | Lim et al. |
| 2012/0014597 A1 | 1/2012 | Matsunaga |
| 2012/0076297 A1 | 3/2012 | Koziol et al. |
| 2012/0084058 A1 | 4/2012 | Sowerby et al. |
| 2012/0092353 A1 | 4/2012 | Paltashev et al. |
| 2012/0102277 A1 | 4/2012 | Kim et al. |
| 2012/0131596 A1 | 5/2012 | Lefebvre et al. |
| 2012/0166757 A1 | 6/2012 | Volvovski et al. |
| 2012/0194527 A1 | 8/2012 | Hartog et al. |
| 2012/0194562 A1 | 8/2012 | Ivashin |
| 2012/0198106 A1 | 8/2012 | Yang |
| 2012/0256771 A1 | 10/2012 | Mitchem et al. |
| 2012/0268558 A1 | 10/2012 | Choi et al. |
| 2012/0275725 A1 | 11/2012 | Kelly et al. |
| 2012/0284587 A1 | 11/2012 | Yu et al. |
| 2012/0290868 A1 | 11/2012 | Gladwin et al. |
| 2012/0301046 A1 | 11/2012 | Wallace |
| 2012/0320067 A1* | 12/2012 | Iourcha .................. G06T 1/20 |
| | | 345/501 |
| 2012/0320069 A1 | 12/2012 | Lee et al. |
| 2013/0018932 A1 | 1/2013 | Bhaskar et al. |
| 2013/0034309 A1* | 2/2013 | Nystad .................. H04N 19/96 |
| | | 382/240 |
| 2013/0036290 A1* | 2/2013 | Nystad .................. G06F 12/06 |
| | | 711/204 |
| 2013/0044961 A1 | 2/2013 | Amit et al. |
| 2013/0091500 A1 | 4/2013 | Earl et al. |
| 2013/0107942 A1 | 5/2013 | Chen et al. |
| 2013/0166260 A1 | 6/2013 | Fan et al. |
| 2013/0169642 A1 | 7/2013 | Frascati et al. |
| 2013/0191649 A1 | 7/2013 | Muff et al. |
| 2013/0195352 A1* | 8/2013 | Nystad .................. G06T 9/40 |
| | | 382/166 |
| 2013/0251256 A1 | 9/2013 | Deng et al. |

(56) References Cited

U.S. PATENT DOCUMENTS

| | | |
|---|---|---|
| 2013/0262538 A1 | 10/2013 | Wegener |
| 2013/0278617 A1 | 10/2013 | Strom et al. |
| 2013/0339322 A1 | 12/2013 | Amit et al. |
| 2014/0063016 A1 | 3/2014 | Howson et al. |
| 2014/0092091 A1 | 4/2014 | Li et al. |
| 2014/0132614 A1 | 5/2014 | Landsberger et al. |
| 2014/0139513 A1 | 5/2014 | Mammou |
| 2014/0146872 A1 | 5/2014 | Du et al. |
| 2014/0157285 A1 | 6/2014 | Chung et al. |
| 2014/0177971 A1 | 6/2014 | Strom et al. |
| 2014/0189281 A1 | 7/2014 | Sokol, Jr. |
| 2014/0192891 A1 | 7/2014 | Alshina et al. |
| 2014/0198122 A1 | 7/2014 | Grossman |
| 2014/0210840 A1* | 7/2014 | Ellis ............... H04N 19/463 345/587 |
| 2014/0258997 A1 | 9/2014 | Lim et al. |
| 2014/0267355 A1 | 9/2014 | Kilgariff et al. |
| 2014/0297962 A1* | 10/2014 | Rozas ............. G06F 12/0808 711/135 |
| 2014/0325266 A1 | 10/2014 | Hoffman et al. |
| 2014/0354641 A1 | 12/2014 | Flordal |
| 2014/0359219 A1 | 12/2014 | Evans et al. |
| 2014/0369614 A1 | 12/2014 | Fenney |
| 2014/0372722 A1 | 12/2014 | Flordal et al. |
| 2015/0012506 A1 | 1/2015 | Bhagavan et al. |
| 2015/0019813 A1* | 1/2015 | Loh ................ G06F 12/0866 711/122 |
| 2015/0019834 A1* | 1/2015 | Loh ................ G06F 12/0868 711/208 |
| 2015/0022520 A1 | 1/2015 | Kim et al. |
| 2015/0046672 A1* | 2/2015 | Sych ............... G06F 12/0875 712/4 |
| 2015/0046678 A1 | 2/2015 | Moloney et al. |
| 2015/0049110 A1 | 2/2015 | Lum et al. |
| 2015/0067008 A1* | 3/2015 | Kamath ............... G06T 5/70 708/202 |
| 2015/0116342 A1 | 4/2015 | Haase et al. |
| 2015/0125085 A1* | 5/2015 | Gupta ................ G06T 9/00 382/239 |
| 2015/0178214 A1 | 6/2015 | Alameldeen et al. |
| 2015/0248292 A1 | 9/2015 | Koker et al. |
| 2015/0262385 A1 | 9/2015 | Satoh et al. |
| 2015/0269181 A1 | 9/2015 | Kuettel et al. |
| 2015/0324228 A1 | 11/2015 | Alsup et al. |
| 2015/0338904 A1 | 11/2015 | Henry et al. |
| 2015/0370488 A1 | 12/2015 | Watanabe et al. |
| 2015/0373353 A1* | 12/2015 | Jeong ................ H04N 19/44 375/240.15 |
| 2015/0378733 A1 | 12/2015 | Beylin et al. |
| 2015/0378734 A1 | 12/2015 | Hansen et al. |
| 2015/0378741 A1 | 12/2015 | Lukyanov et al. |
| 2015/0379682 A1 | 12/2015 | Golas et al. |
| 2015/0379684 A1* | 12/2015 | Ramani ............... G06T 11/40 345/531 |
| 2015/0381202 A1* | 12/2015 | Satpathy ............. H03M 7/3084 711/108 |
| 2016/0004642 A1 | 1/2016 | Sugimoto et al. |
| 2016/0035128 A1 | 2/2016 | Zhao et al. |
| 2016/0055093 A1 | 2/2016 | Turner et al. |
| 2016/0055094 A1 | 2/2016 | Patsilaras et al. |
| 2016/0078665 A1 | 3/2016 | Kwon et al. |
| 2016/0078666 A1 | 3/2016 | Park et al. |
| 2016/0086299 A1 | 3/2016 | Sharma et al. |
| 2016/0092371 A1 | 3/2016 | Shanbhogue |
| 2016/0117246 A1 | 4/2016 | Maurice et al. |
| 2016/0140688 A1* | 5/2016 | Lee ............... G06F 9/00 345/426 |
| 2016/0198164 A1 | 7/2016 | Lin et al. |
| 2016/0239209 A1 | 8/2016 | Malyugin et al. |
| 2016/0248440 A1* | 8/2016 | Greenfield ............. H03M 7/30 |
| 2016/0260228 A1 | 9/2016 | Chen et al. |
| 2016/0260246 A1 | 9/2016 | Oldcorn et al. |
| 2016/0283390 A1 | 9/2016 | Coulson |
| 2016/0291984 A1 | 10/2016 | Lu et al. |
| 2016/0300320 A1* | 10/2016 | Iourcha ............... G06T 15/005 |
| 2016/0306738 A1 | 10/2016 | Bak et al. |
| 2016/0321182 A1 | 11/2016 | Grubisic et al. |
| 2016/0323103 A1 | 11/2016 | Baptist et al. |
| 2016/0323407 A1 | 11/2016 | de los Reyes Darias et al. |
| 2016/0342545 A1 | 11/2016 | Arai et al. |
| 2016/0353122 A1* | 12/2016 | Krajcevski .......... H03M 7/3084 |
| 2016/0364830 A1 | 12/2016 | Deng et al. |
| 2016/0379337 A1 | 12/2016 | Tsai et al. |
| 2017/0032543 A1* | 2/2017 | Cho ................ G06T 15/04 |
| 2017/0084055 A1* | 3/2017 | Kwon ................ G06T 9/00 |
| 2017/0115924 A1 | 4/2017 | Abali et al. |
| 2017/0163284 A1 | 6/2017 | Conway et al. |
| 2017/0185451 A1 | 6/2017 | Mirza et al. |
| 2017/0185533 A1* | 6/2017 | Rozas ................ G06F 12/1408 |
| 2017/0186224 A1* | 6/2017 | Diard .................... G06T 17/005 |
| 2017/0221256 A1* | 8/2017 | Maksymczuk .......... G06T 9/00 |
| 2017/0256020 A1 | 9/2017 | Sansottera et al. |
| 2017/0256025 A1* | 9/2017 | Abraham ............ H04N 19/426 |
| 2017/0257513 A1 | 9/2017 | Matsumoto |
| 2017/0269851 A1 | 9/2017 | Oportus Valenzuela et al. |
| 2017/0278215 A1 | 9/2017 | Appu et al. |
| 2017/0287098 A1 | 10/2017 | Strugar et al. |
| 2017/0344485 A1 | 11/2017 | Chen et al. |
| 2017/0345125 A1* | 11/2017 | Golas ................ G06T 11/40 |
| 2017/0371792 A1* | 12/2017 | Oportus Valenzuela .................... G06F 12/0802 |
| 2017/0371797 A1* | 12/2017 | Oportus Valenzuela .................... G06F 12/0842 |
| 2018/0004532 A1 | 1/2018 | Yasin et al. |
| 2018/0012392 A1 | 1/2018 | Kryachko |
| 2018/0048532 A1 | 2/2018 | Poort et al. |
| 2018/0052773 A1* | 2/2018 | Lin ................ G06F 12/0864 |
| 2018/0060235 A1 | 3/2018 | Yap et al. |
| 2018/0074827 A1* | 3/2018 | Mekkat ............. G06F 9/3834 |
| 2018/0082398 A1 | 3/2018 | Ashkar et al. |
| 2018/0082470 A1 | 3/2018 | Nijasure et al. |
| 2018/0084269 A1* | 3/2018 | Qiu ................ H04N 19/176 |
| 2018/0088822 A1 | 3/2018 | Alameldeen et al. |
| 2018/0089091 A1 | 3/2018 | Akenine-Moller et al. |
| 2018/0095823 A1* | 4/2018 | Fahim ............... G06F 12/0875 |
| 2018/0103261 A1 | 4/2018 | Sun et al. |
| 2018/0108331 A1* | 4/2018 | Chao ................ H04N 19/423 |
| 2018/0114290 A1 | 4/2018 | Paltashev et al. |
| 2018/0150991 A1* | 5/2018 | Tannenbaum ......... G06T 15/005 |
| 2018/0165210 A1 | 6/2018 | Sethuraman |
| 2018/0165786 A1 | 6/2018 | Bourd et al. |
| 2018/0165789 A1 | 6/2018 | Gruber et al. |
| 2018/0165790 A1* | 6/2018 | Schneider .......... G06F 12/0815 |
| 2018/0173623 A1 | 6/2018 | Koob et al. |
| 2018/0182155 A1 | 6/2018 | Mirza et al. |
| 2018/0189924 A1 | 7/2018 | Gould et al. |
| 2018/0217930 A1 | 8/2018 | Koob et al. |
| 2018/0225224 A1 | 8/2018 | Senior et al. |
| 2018/0239705 A1 | 8/2018 | Heirman et al. |
| 2018/0246655 A1* | 8/2018 | Schmit ................ G06F 3/0634 |
| 2018/0247387 A1 | 8/2018 | Riguer |
| 2018/0292897 A1 | 10/2018 | Wald et al. |
| 2018/0293695 A1 | 10/2018 | Sharma et al. |
| 2018/0293697 A1 | 10/2018 | Ray et al. |
| 2018/0293701 A1 | 10/2018 | Appu et al. |
| 2018/0293703 A1 | 10/2018 | Vaidyanathan et al. |
| 2018/0300857 A1 | 10/2018 | Appu et al. |
| 2018/0300903 A1 | 10/2018 | Gierach et al. |
| 2018/0301125 A1* | 10/2018 | Haraden ............ G06F 12/0862 |
| 2018/0308211 A1 | 10/2018 | Surti et al. |
| 2018/0308280 A1 | 10/2018 | Surti et al. |
| 2018/0308285 A1 | 10/2018 | Doyle et al. |
| 2018/0329830 A1 | 11/2018 | Senior et al. |
| 2018/0349315 A1 | 12/2018 | Heggelund et al. |
| 2019/0034333 A1 | 1/2019 | Sazegari et al. |
| 2019/0042410 A1 | 2/2019 | Gould et al. |
| 2019/0052553 A1* | 2/2019 | Subramanian ......... H04L 47/38 |
| 2019/0052913 A1* | 2/2019 | Hachfeld .............. H04N 19/184 |
| 2019/0066352 A1* | 2/2019 | Kazakov ............. G06T 15/04 |
| 2019/0068974 A1 | 2/2019 | Pohl |
| 2019/0087305 A1 | 3/2019 | Mola |
| 2019/0095331 A1* | 3/2019 | Diamond ............ G06F 12/121 |
| 2019/0096095 A1 | 3/2019 | Veernapu et al. |

(56) References Cited

U.S. PATENT DOCUMENTS

| | | |
|---|---|---|
| 2019/0102178 A1 | 4/2019 | Zbiciak |
| 2019/0102300 A1 | 4/2019 | Blankenship et al. |
| 2019/0102324 A1 | 4/2019 | Ozsoy et al. |
| 2019/0121880 A1 | 4/2019 | Scherer, III et al. |
| 2019/0171894 A1* | 6/2019 | Poddar .................. G06V 10/50 |
| 2019/0206090 A1 | 7/2019 | Ray et al. |
| 2019/0213775 A1 | 7/2019 | Dimitrov et al. |
| 2019/0243780 A1 | 8/2019 | Gopal et al. |
| 2019/0250921 A1* | 8/2019 | Forsyth ............... G06F 9/30032 |
| 2019/0286570 A1 | 9/2019 | Miura |
| 2019/0304140 A1* | 10/2019 | Fuller .................. G06F 12/023 |
| 2019/0311529 A1 | 10/2019 | Lacey et al. |
| 2019/0318445 A1 | 10/2019 | Benthin et al. |
| 2019/0377498 A1* | 12/2019 | Das ....................... G06F 3/0673 |
| 2020/0118299 A1* | 4/2020 | Iourcha ................ G06T 15/005 |
| 2020/0125501 A1 | 4/2020 | Durham et al. |
| 2020/0162100 A1 | 5/2020 | Beckman et al. |
| 2020/0167076 A1* | 5/2020 | Lai ......................... G06F 3/064 |
| 2020/0174945 A1 | 6/2020 | Mukherjee et al. |
| 2020/0186811 A1 | 6/2020 | Madajczak et al. |
| 2020/0218471 A1* | 7/2020 | Chen .................... G06F 3/0659 |
| 2020/0250097 A1* | 8/2020 | Holland ............. G06F 12/1009 |
| 2021/0011646 A1* | 1/2021 | Nystad .................... G06T 1/60 |
| 2021/0049099 A1* | 2/2021 | Turner ............... G06F 12/0246 |
| 2021/0141729 A1* | 5/2021 | Rao .................... G06F 12/0848 |
| 2021/0142438 A1* | 5/2021 | Appu .................... G06F 9/3818 |
| 2021/0295583 A1* | 9/2021 | Vaidyanathan ....... G06T 15/005 |
| 2021/0312592 A1* | 10/2021 | Liu ........................ G06N 3/045 |
| 2021/0366177 A1* | 11/2021 | Viitanen .................. G06T 1/20 |
| 2021/0398241 A1* | 12/2021 | Fetterman ................. G06T 1/60 |
| 2022/0012592 A1* | 1/2022 | Jain ........................ G06F 17/16 |
| 2022/0051476 A1* | 2/2022 | Woop .................... G06T 3/4007 |
| 2022/0066776 A1* | 3/2022 | Stevens .................. G06F 9/324 |
| 2022/0069840 A1* | 3/2022 | Haggebrant ........ H03M 7/6017 |
| 2022/0092826 A1* | 3/2022 | Sharma ..................... G06T 1/60 |
| 2022/0197651 A1* | 6/2022 | Kumar ..................... G06T 1/60 |
| 2022/0207644 A1* | 6/2022 | Korobkov ........... H04N 19/423 |
| 2022/0301228 A1* | 9/2022 | Junkins .................... G06T 1/60 |
| 2022/0309190 A1* | 9/2022 | Gopal ..................... G06F 21/72 |
| 2022/0309732 A1* | 9/2022 | Woo ...................... G06T 15/005 |
| 2022/0398686 A1* | 12/2022 | Persson .................. G06T 15/04 |
| 2022/0413854 A1* | 12/2022 | Ray ....................... G06T 15/005 |
| 2022/0414011 A1* | 12/2022 | Mandal ..................... G06T 7/50 |
| 2022/0414939 A1* | 12/2022 | Pillai ................... G06T 15/205 |
| 2023/0100106 A1* | 3/2023 | Dewan .................... G06F 3/061 |
| | | 713/193 |
| 2023/0195625 A1* | 6/2023 | Allan .................. G06F 12/0802 |
| | | 711/118 |
| 2023/0195638 A1* | 6/2023 | Uhrenholt ........... G06F 12/0864 |
| | | 711/118 |
| 2023/0297382 A1* | 9/2023 | Abali .................. G06F 12/0802 |
| | | 712/220 |
| 2023/0315627 A1* | 10/2023 | Abali .................. G06F 12/0811 |
| | | 711/118 |
| 2024/0078186 A1* | 3/2024 | Uhrenholt ........... G06F 12/0891 |

FOREIGN PATENT DOCUMENTS

| | | |
|---|---|---|
| CN | 101470671 A | 7/2009 |
| JP | 2000105839 A | 4/2000 |

OTHER PUBLICATIONS

Woo et al., "A 195mW, 9.1 MVertices/s Fully Programmable 3-D Graphics Processor for Low-Power Mobile Devices", IEEE Journal of Solid-State Circuits, Nov. 19, 2008, pp. 2370-2380, vol. 43, No. 11, IEEE, Piscataway, NJ, USA.

Akenine-Moller, et al., "6.3 Procedural Texturing", Real-Time Rendering, pp. 178-180, Third Edition, Jul. 25, 2008, CRC Press.

International Search Report and Written Opinion in International Application No. PCT/US2012/042442, mailed Oct. 31, 2012, 11 pages.

Andersson, Johan, "Chapter 5: Terrain Rendering in Frostbite Using Procedural Shader Splatting", Advanced Real-Time Rendering in 3D Graphics and Games, SIGGRAPH 2007 Course 28, Aug. 8, 2007, 21 pages.

Andersson, Johan, "Terrain Rendering in Frostbite Using Procedural Shader Splatting", Advanced Real-Time Rendering in 3D Graphics and Games, SIGGRAPH 2007 Course 28, Aug. 8, 2007, 52 pages.

Beam, Josh, "Tutorial: Getting Started with the OpenGL Shading Language (GLSL)", Dec. 30, 2010, 7 pages, http://joshbeam.com/articles/getting_started_with_glsl/. [Retrieved Oct. 14, 2014].

Notification of the First Office Action in Chinese Application No. 201280029522.3, mailed Mar. 30, 2016, 20 pages.

Office Action in Japanese Patent Application No. 2014-515991, mailed Mar. 29, 2016, 9 pages.

Final Office Action in Japanese Patent Application No. 2014-515991, mailed Aug. 30, 2016, 6 pages.

Communication pursuant to Article 94(3) in European Application No. 12732897.9, mailed Oct. 13, 2017, 5 pages.

* cited by examiner

REAL TIME ON-CHIP TEXTURE DECOMPRESSION USING SHADER PROCESSORS

CROSS REFERENCE TO RELATED APPLICATIONS

This application is a continuation of U.S. patent application Ser. No. 16/709,462, now U.S. Pat. No. 11,043,010 entitled "REAL TIME ON-CHIP TEXTURE DECOMPRESSION USING SHADER PROCESSORS", filed Dec. 10, 2019, which is a continuation of U.S. patent application Ser. No. 15/181,130, now U.S. Pat. No. 10,510,164, entitled "REAL TIME ON-CHIP TEXTURE DECOMPRESSION USING SHADER PROCESSORS", filed Jun. 13, 2016, which is a continuation of U.S. patent application Ser. No. 13/163,071, now U.S. Pat. No. 9,378,560, entitled "REAL TIME ON-CHIP TEXTURE DECOMPRESSION USING SHADER PROCESSORS", filed Jun. 17, 2011, the entirety of which is incorporated herein by reference.

BACKGROUND OF THE INVENTION

Field of the Invention

This disclosure relates generally to graphics processing, and in particular to a processing unit, method, and medium of texture decompression.

Description of the Related Art

Computer graphics processing systems process large amounts of data, typically with a graphics processing unit (GPU) performing a large percentage of the processing. A GPU is a complex integrated circuit that is configured to perform, inter alia, graphics-processing tasks. For example, a GPU may execute graphics-processing tasks required by an end-user application, such as a video-game application. The GPU may be a discrete device or may be included in the same device as another processor, such as a central processing unit (CPU).

A GPU produces the pixels that make up an image from a higher level description of its components in a process known as rendering. GPU's typically utilize a concept of continuous rendering by the use of computing elements to process pixel, texture, and geometric data. The computing elements may execute the functions of rasterizers, setup engines, color blenders, hidden surface removal, and texture mapping. These computing elements are often referred to as shaders, shader processors, shader arrays, shader pipes, shader pipe arrays, shader pipelines, or a shader engine, "shader" being a term in computer graphics referring to a set of software instructions or a program used by a graphics resource primarily to perform rendering effects. "Shader" may also refer to an actual hardware component or processor used to execute software instructions. A shader processor or program may read and render data and perform any type of processing of the data. GPU's equipped with a unified shader also simultaneously support many types of shader processing, from pixel, vertex, primitive, and generalized compute processing.

Much of the processing involved in generating complex graphics scenes involves texture data. Textures may be any of various types of data, such as color, transparency, lookup tables, or other data. In some embodiments, textures may be digitized images to be drawn onto geometric shapes to add visual detail. A large amount of detail, through the use of textures, may be mapped to the surface of a graphical model as the model is rendered to create a destination image. The purpose of texture mapping is to provide a realistic appearance on the surface of objects. Textures may specify many properties, including colors, surface properties like specular reflection or fine surface details in the form of normal or bump maps. A texture could also be image data, color or transparency data, roughness/smoothness data, reflectivity data, etc. A 'texel' is a texture element in the same way a 'pixel' is a picture element. The terms 'texel' and 'pixel' may be used interchangeably within this specification.

In 3D computer graphics, surface detail on objects is commonly added through the use of textures. For example, a 2D bitmap image of a brick wall may be applied, using texture mapping, to a set of polygons representing a 3D model of a building to give the 3D rendering of that object the appearance that it is made of bricks. Providing realistic computer graphics typically requires many high-quality, detailed textures. The use of textures can consume large amounts of storage space and bandwidth, and consequently textures may be compressed to reduce storage space and bandwidth utilization.

Texture compression has thus become a widely accepted feature of graphics hardware in general and 3D graphics hardware in particular. The goal of texture compression is to reduce storage and bandwidth costs on the graphics system while retaining as much of the quality of the original texture as possible. The compression and decompression methods described herein may be used to compress various types of texture information including image data, picture data, transparency information, smoothness or roughness data, or any other similarly structured data. As such, the term texture is used broadly herein to refer to the data being compressed or decompressed as part of a GPU.

Fixed-rate compression schemes have traditionally been used to compress textures and may generally suffer from several shortcomings as compared to variable-rate schemes. Unlike fixed-rate compression, variable-rate compression is more flexible and may allow for adjustments to quality as desired. For example, variable-rate compression may be set to achieve lossless compression. In some cases, the use of variable-rate compression schemes may provide better compression than traditional fixed-rate compression schemes. A variable-rate compression scheme, such as Joint Photographic Experts Group (JPEG), is typically not used for texture compression when on-the-fly decompression is desired due to the high complexity and implementation cost. Therefore, there is a need in the art for methods and mechanisms to enable low-cost on-the-fly decompression of variable-rate compressed textures.

In view of the above, improved processing units, methods, and mediums for performing real time decompression of compressed textures are desired.

SUMMARY OF EMBODIMENTS OF THE INVENTION

Various embodiments of processing units, methods and mediums for decompressing texture data are contemplated. In one embodiment, a first shader of a plurality of shaders may require a block of a texture to produce data used by a display device or in further processing. The first shader may be configured to calculate a virtual address of the block within an uncompressed version of the texture and convey the virtual address with a request for the block to a cache memory device. In response to determining an uncompressed version of the block is not stored in the cache, a second shader of the plurality of shaders may be initiated as a decompressing shader and the virtual address of the uncompressed version of the block may be passed to the decompressing shader. Also, in response to determining the uncompressed version of the block is not in the cache, a cache line may be allocated for the requested block.

The second shader may be configured to receive the compressed version of the block from the cache. The cache may be configured to utilize a table which maps a virtual address space of an uncompressed version of the texture to an address space of a compressed version of the texture. The cache and/or the second shader may be configured to determine the location and size of the compressed version of the block from the table. The table may also contain additional information, such as the value of the DC coefficient of a compressed version of each block of the texture.

After receiving the compressed version of the block from the cache, the second shader may be configured to decompress the compressed version of the block and then write a decompressed version of the block to the cache. After the decompressed version of the block has been written to the cache, the first shader may be configured to receive the decompressed version of the block from the cache. The first shader may then be configured to process the decompressed version of the block such that it may be applied to a rendered surface for display.

These and other features and advantages will become apparent to those of ordinary skill in the art in view of the following detailed descriptions of the approaches presented herein.

BRIEF DESCRIPTION OF THE DRAWINGS

The above and further advantages of the systems, methods, and mechanisms may be better understood by referring to the following description in conjunction with the accompanying drawings, in which.

DETAILED DESCRIPTION

Figure 1:
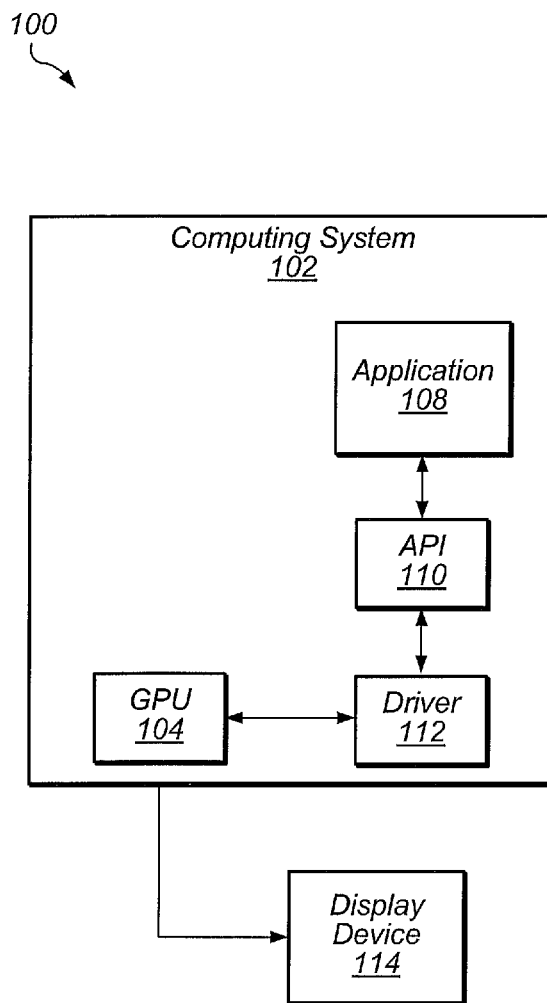
FIG. 1 illustrates one embodiment of a computer graphics system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A GPU comprising a plurality of shaders . . . ." Such a claim does not foreclose the GPU from including additional components (e.g., a texture unit, input/output circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware for example, circuits, memory storing program instructions executable to implement the operation, etc. Reciting that a unit/circuit/component is "configured to" perform one or more tasks is expressly intended not to invoke 35 U.S.C. § 114, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

Referring to FIG. 1, a block diagram of one embodiment of a computer graphics system is shown. Computer graphics system 100 includes computing system 102 and display device 114. Computing system 102 includes a graphics processing unit (GPU) 104 for processing graphics data. In some embodiments, GPU 104 may reside on a graphics card within computing system 102. GPU 104 may process graphics data to generate color and luminance values for each pixel of a frame for display on display device 114. GPU 104 may include one or more processing cores and/or an array of shaders to perform pixel manipulations.

Computing system 102 may include a software program application 108, an application programming interface (API) 110, and a driver 112, which may run on a CPU (not shown). API 110 may adhere to an industry-standard specification, such as OpenGL or DirectX. API 110 may communicate with driver 112. Driver 112 may translate standard code received from API 110 into a native format of instructions understood by GPU 104. GPU 104 may then execute the instructions received from driver 112.

Textures may be transferred to GPU 104 from system memory (not shown) or another storage device of computing system 102. In one embodiment, textures may be compressed using JPEG compression. In other embodiments, other types of variable-rate compression may be used to compress the textures. For the remainder of this specification, examples of JPEG type encoding will be used to describe the various embodiments. However, this is for illustrative purposes only, and other types of variable-rate compression may also be used with the methods and mechanisms described herein.

Driver 112 may reformat compressed textures as part of a tiling process. This reformatting may entail transcoding a JPEG-compressed texture into a hardware internal JPEG format. In other embodiments, the JPEG-compressed texture may be transcoded into other formats. The hardware internal JPEG format may contain additional information to facilitate the decompression process. For example, the hardware internal JPEG format may include a table with information on the location and sizes of the various blocks of the JPEG-compressed texture. The table may also include information on the DC coefficients of each 8×8 block of the JPEG-compressed texture. The table may further include Huffman codes, quantization tables, and other information to facilitate the decompression of the compressed texture. Driver 112 may also allocate a virtual address space for each of the compressed textures utilized by computing system 102. The size of each virtual address space may correspond to the size of the uncompressed texture.

Computing system 102 will typically have various other devices/components not shown in FIG. 1, such as a CPU, buses, memory, peripheral devices, etc. For example, computing system 102 may include an I/O interface which may be coupled to other devices, such as a keyboard, printer, and mouse, in addition to display device 114. In some embodiments, computing system 102 may include a plurality of GPU's.

In another embodiment, a processor, such as GPU 104, may be defined in software. The software instructions may be stored in a computer readable storage medium and when executed on a computing device, may define the processor. In a further embodiment, processors may comprise GPU's, CPU's, video processing units (VPU's), coprocessors, and/or other types of processors that are configured to process texture data. In various embodiments, the GPU and CPU may be separate integrated circuit devices/packages. In various embodiments, the GPU and CPU may be included in a single integrated circuit or package.

Figure 2:
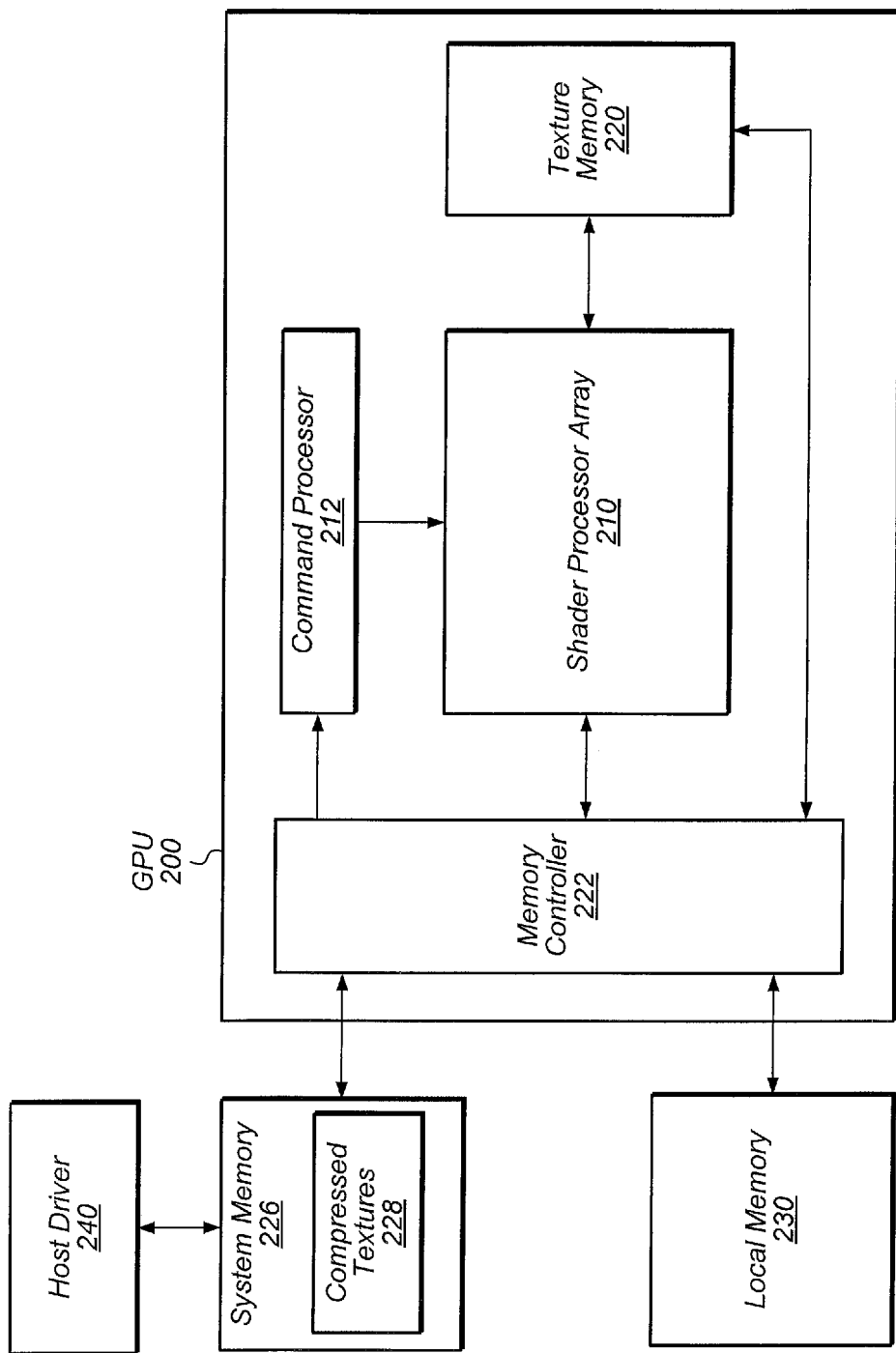
FIG. 2 is a block diagram of a GPU in accordance with one or more embodiments.

Referring to FIG. 2, a block diagram of one embodiment of a GPU 200 is shown. GPU 200 may be utilized to perform graphics-processing related tasks (e.g., using vertex shaders, geometry shaders, pixel shaders, etc.) and general-computing tasks (e.g., mathematical algorithms, physics simulations, etc.). In the example shown, GPU 200 includes shader processor array 210, command processor 212, texture memory 220, and memory controller 222 which may be configured to support direct-memory access (DMA). It is noted that the embodiment of GPU 200 depicted in FIG. 2 is for illustrative purposes only, and those skilled in the art will appreciate numerous alternative embodiments are possible. All such alternative embodiments are contemplated. Note also that GPU 200 may include many other components not shown in FIG. 2.

In the embodiment shown, shader processor array 210 comprises multiple processing units which may perform in parallel. Command processor 212 may issue commands and assign processing tasks to individual shader processors of shader processor array 210. In some embodiments, command processor 212 may include a dispatch processor (not shown) configured to divide a received workload into threads and distribute the threads among processing units of the shader processor array. Shader processor array 210 may be configured to perform various types of functions, including processing texture data and performing rendering algorithms to transform 3-dimensional texture objects into a 2-dimensional image. As noted above, shader processor array 210 may include a plurality of shader processors, and the plurality of shader processors may implement algorithms using a wide range of mathematical and logical operations on vertices and other texture data.

In some embodiments, GPU 200 may be configured to utilize one or more on-chip and/or off chip memories for temporarily storing data. While such memories may be referred to herein as "caches", it is noted that the use of such a term does not necessarily require any particular organization, structure or policies for such memories. For example, while such memories may utilize organizations and policies typically associated with central processing unit (CPU) caches—such as set associative organizations and replacement policies, any desired organization and/or storage policies may be utilized. In various embodiments, texture memory 220 is used for storing texture data. In such an embodiment, texture memory 220 may provide faster access to certain texture data, such as texture data that is frequently used, than would be possible if the texture data were only stored in system memory 226 or local memory 230. System memory 226 may represent memory accessible by both GPU 200 and a central processing unit (CPU, not shown), while local memory may represent memory which is directly accessible by only GPU 200. In various embodiments, texture memory 220 may include multiple levels in a hierarchical arrangement as is commonly known in the cache arts. The number of such cache levels included in texture cache system 220 may vary from one embodiment to the next. Texture memory 220 may be implemented using a variety of memory technologies, such as static memory (e.g., SRAM), stacked-memory using dynamic memory (e.g., DRAM), or otherwise. Texture memory 220 may also include caching logic. The caching logic may be configured to cache data into texture memory 220 and to implement cache management policies that consider the relative latency and/or bandwidth of cache system 220 versus system memory 226.

GPU 200 may also include memory controller 222. Memory controller 222 may be coupled to system memory 226 and local memory 230. Memory controller 222 may access data, such as compressed textures 228, in system memory 226. Compressed textures 228 may include a plurality of textures which may be compressed with any of a variety of variable-rate compression techniques, such as JPEG. Compressed textures 228, or portions of individual textures within compressed textures 228, may be transferred to texture memory 220 and shader processor array 210 of GPU 200 (via memory controller 222) without first being decompressed. Host driver 240 may transfer commands and data to GPU 200 via system memory 226. Local memory 230 may be utilized for storing vertex data and other data used by GPU 200, and GPU 200 may write frame data to local memory 230.

Figure 3:
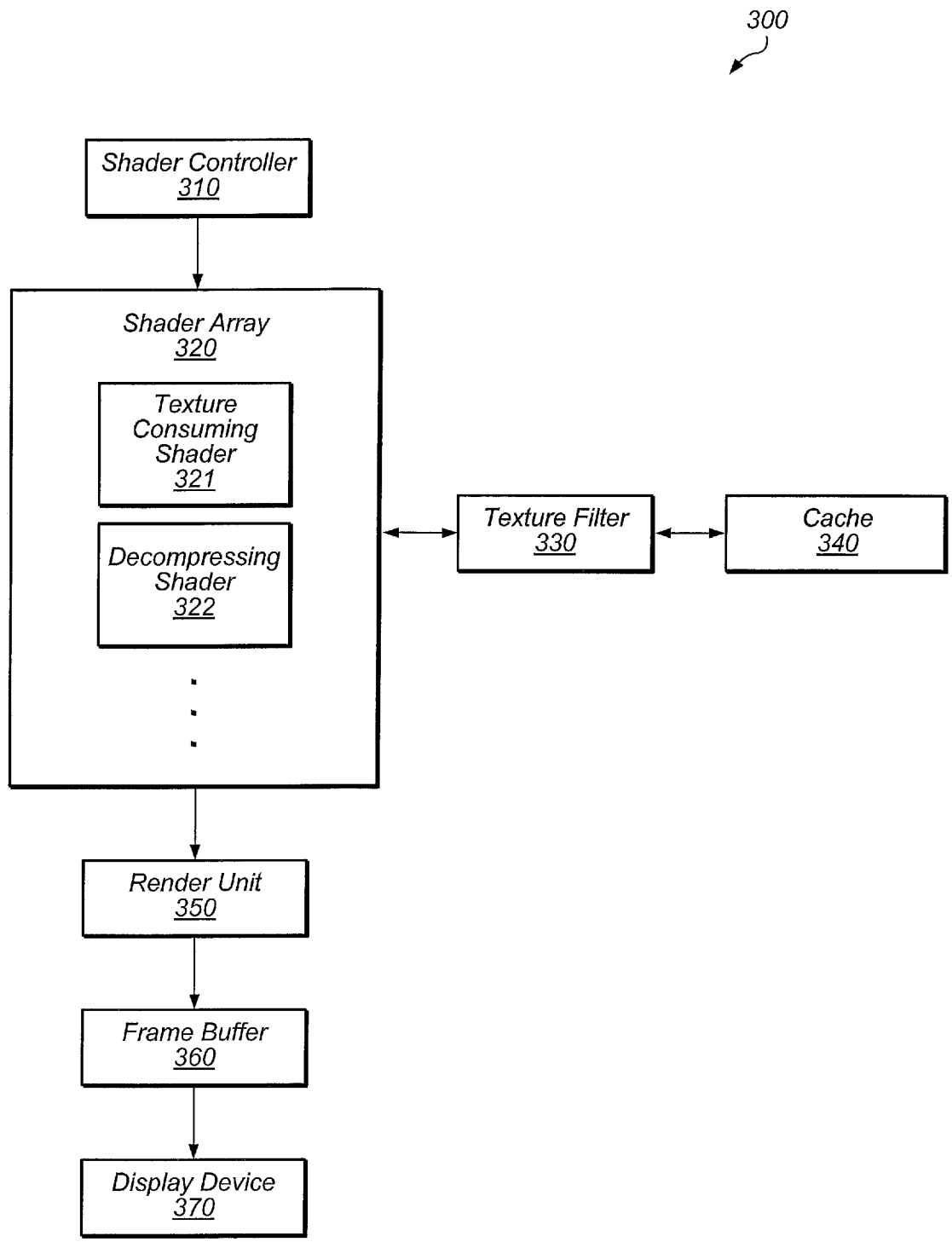
FIG. 3 illustrates a block diagram of one embodiment of a graphics processing system.

Referring now to FIG. 3, a block diagram of one embodiment of a graphics processing system is shown. Graphics processing system 300 may include shader controller 310, and shader controller 310 may assign specific graphics processing tasks to individual shader computing units within shader array 320. Shader controller 310 may perform pre-processing on graphics-processing tasks and general-computing tasks, and issue these tasks to shader array 320. Shader controller 310 may identify which processing elements of the shader array are available to process new workloads, and shader controller 310 may send the new workloads to the available processing elements of shader array 320. Shader controller 310 may keep track of which workloads are being processed by the different processing elements of the shader array, enabling a plurality of threads to execute in parallel.

Shader array 320 may include texture consuming shader 321 and decompressing shader 322, which are representative of any number and type of shader processors which may be included in shader array 320. In various embodiments, shader array 320 may include an additional shader processor which may be configured to generate texture data procedurally. Generally speaking, procedural texture generation refers to the process of generating a texture algorithmically. In various embodiments this procedural generation of texture is performed dynamically rather than in advance. Shader array 320 may be used for texture mapping and producing image data for a display device, among other tasks. As part of performing these operations, texture consuming shader 321 may issue a texture request to texture filter 330. The texture request may be for one or more portions (e.g., blocks, texels) of the texture. Texture filter 330 may generate a virtual address for the requested texture, and convey the virtual address with the request to cache 340. Cache 340 may store textures in the form of texel data associated with pixels. Some of the textures may be compressed, and some of the textures may be uncompressed.

After receiving the virtual address from texture filter 330, cache 340 may perform an address check against all known virtual address ranges to determine if the requested texture is stored in cache 340. If an uncompressed version of the requested texture is stored in cache 340, cache 340 may return the uncompressed version of the texture to texture filter 330. If the uncompressed version of the texture is not stored in cache 340, the attempted request may result in a cache miss. In response to a cache miss, decompressing shader 322 may be initiated for the purpose of decompressing a compressed version of the texture. In various embodiments, shader array 320 may receive a request from cache 340, or otherwise, to initiate a decompressing shader. Also in response to a cache miss, texture consuming shader 321 may pass the virtual address of the texture to decompressing shader 322. Resources for the decompressing shader program may be pre-allocated on decompressing shader 322 to decrease the shader start latency and simplify resource management. The request may be routed to a particular shader processor of shader array 320 based on the virtual address of the block being requested.

Cache 340 may be queried for a compressed version of the texture, and if the compressed version of the texture is stored in cache 340, the compressed version of the texture may be returned to decompressing shader 322. If the compressed version of the texture is not stored in cache 340, the compressed version of the texture may be retrieved from system memory or another location. Decompressing shader 322 may also receive additional tables, textures, and/or constants to facilitate the decompression operation. Decompressing shader 322 may decompress some additional compressed data necessary to decompress the requested texture. In the case of a JPEG-compressed texture, the texture may be transcoded from the original code to a new encoding scheme, and the new encoding scheme may be designed to make decompression more efficient. After decompressing shader 322 has received and decompressed the compressed version of the texture, texture consuming shader 321 may utilize the decompressed version of the texture for the appropriate rendering calculations. This process may continue for a plurality of textures and/or portions of textures. In another embodiment, the functions described as being performed by texture filter 330 may be performed by shader array 320, and shader array 320 may be coupled directly to cache 340.

Cache 340 may utilize a table to determine the address to which a given virtual address maps for the compressed versions of textures stored in cache 340. In various embodiments, the table (or portions thereof) may be stored in cache 340 or elsewhere. In one embodiment, the table may map a virtual address to another address of the compressed version of a texture. The address to which the virtual address is mapped may or may not itself be a virtual address. Numerous options for the types of addressing schemes utilized are possible and are contemplated. The table may store an offset for each block of the compressed version of the texture, wherein the offset gives the location from the beginning of the compressed version of the texture to the block. In various embodiments, the table may facilitate random access to the blocks of one or more compressed textures. The cache logic of cache 340 may determine an address of a given block in response to a request for the compressed version of the block. The cache logic may use the table to determine an offset at which the desired block is stored within a page or fetch unit of the cache. The plurality of shaders of shader array 320 may also use the table to determine the offset of a requested block of a texture. In various embodiments, cache 340 may utilize a plurality of tables with mapping information on a plurality of textures.

After the texture data has been processed, shader array 320 may convey the image data to render unit 350. Render unit 350 may assign a specific number value that defines a unique color attribute for each pixel of an image frame. The number values may be passed to frame buffer 360 where they may be stored for use at the appropriate time, such as when they are rendered on display device 370.

On a subsequent operation, texture consuming shader 321 may be configured to perform the functions of a decompressing shader, and decompressing shader 322 may be configured to perform the functions of a texture consuming shader. Each shader processor of shader array 320 may be configured to perform a variety of functions depending on the requirements of the current operation.

In various embodiments, load balancing may be utilized to assign decompression tasks to underutilized shaders. Also, some space may be reserved in a number of compute units to allow decompression shaders to be launched on a number of compute units. Furthermore, multiple decompression requests may be packed into single instruction multiple data (SIMD) vectors. The SIMD vectors may facilitate the decompression of multiple blocks in one vector. In one embodiment, 16 blocks may be decompressed in one vector, with one block per four lanes.

In various embodiments, graphics processing system 300 may enable on-the-fly procedural generation of texture data. One shader may generate on-the-fly texture data, and a second shader may utilize the generated texture data for rendering operations. A decompressing shader may access compressed data and another shader may be utilized to decompress additional data, such as one or more tables. Some of the compressed data may be compressed using a variety of compression techniques. In various embodiments, the decompressing shader may request data from the cache, and in response to a cache miss, another shader may be initiated to procedurally generate texture data.

Figures 4A, 4B:
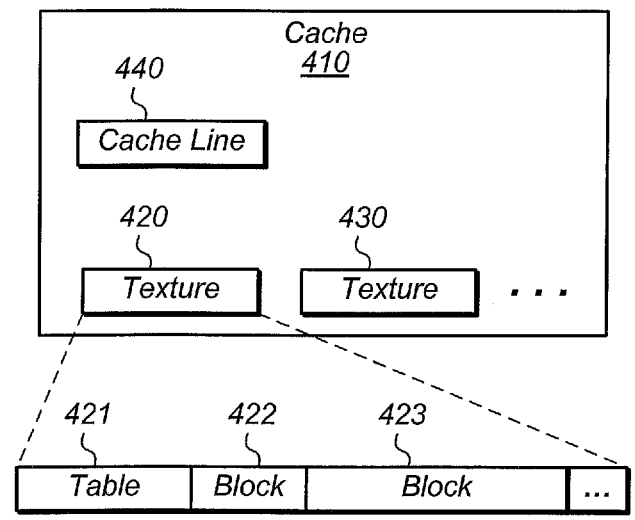
FIG. 4A illustrates a block diagram of one embodiment of a data cache.
FIG. 4B is a block mapping table in accordance with one or more embodiments.

Turning now to FIG. 4A, a block diagram of one embodiment of a data cache is shown. Cache 410 may contain portions of textures 420 and 430, which are representative of any number of portions of textures which may be stored in cache 410. Textures 420 and 430 may be compressed textures, while the plurality of textures stored in cache 410 may be a mix of compressed and uncompressed textures. Texture 420 may include blocks 422 and 423, which are representative of any number of blocks of texture 420. Texture 420 may also include table 421, which may map a virtual address space of texture 420 to an address space of compressed texture 420. Texture 430 may be organized similarly to texture 420. In another embodiment, table 421 may be stored separately from texture 420.

When a texture consuming shader requests a block of a texture from cache 410, and the request results in a cache miss, cache 410 may allocate cache line 440 for the requested block. Cache 410 may convey the address of the allocated cache line to a decompressing shader. After the decompressing shader has decompressed the compressed block corresponding to the requested block, the decompressing shader may be configured to write the decompressed block to cache line 440. Alternatively, the decompressing shader may write the decompressed block to various locations within cache 410. In response to the decompressing shader writing the decompressed block to cache line 440, the texture consuming shader may be configured to fetch the decompressed block from cache 410. The corresponding latency compensation queues may need to be extended to accommodate the larger latency resulting from the on-the-fly decompression of the compressed block.

After the decompressed version of the block has been written to cache line 440, cache 410 may store the compressed version of the block and the decompressed version of the block. In various embodiments, cache 410 may execute a retention policy that discards one of the versions of the block in response to determining both versions are stored in cache 410. In one embodiment, the decompressed version of the block may be discarded after it has been fetched by the texture consuming shader. In another embodiment, the compressed version of the block may be discarded after the decompressed version of the block has been written to cache 410. In a further embodiment, both the compressed and decompressed version of the block may be maintained in cache 410 for an extended period of time.

In response to a request for an uncompressed version of a block of a texture, cache 410 may determine that the uncompressed version is not stored in cache 410. In various embodiments, in response to such a determination, cache 410 may automatically search for the compressed version of the block. If the compressed version of the block is stored in cache 410, cache 410 may notify a shader or other processing unit and/or cache 410 may convey the compressed version of the block to the shader or other processing unit.

In some embodiments, in response to a cache miss on a request for an uncompressed block, a separate software thread may be started, and the thread may initiate a decompressing shader. The texture consuming shader may convey the virtual address of the block to the decompressing shader.

In various embodiments, when the shader finishes the decompression task, the decompressing shader may convey the uncompressed block(s) to the cache. In other embodiments, when the decompressing shader finishes the decompression operation, the decompressing shader may convey the shader output to the texture consuming shader.

Referring now to FIG. 4B, a block diagram of one embodiment of a block mapping table is shown. Table 421 may store mapping information for the plurality of blocks of texture 420 (of FIG. 4A). In various embodiments, table 421 may be organized in a variety of ways with other types of information in addition to what is illustrated in FIG. 4B. For example, in one embodiment, table 421 may include a DC coefficient value for each block of texture 420.

Table 421 may map the virtual address space of texture 420 to the physical address space of compressed texture 420 (of FIG. 4A). A decompressing shader (not shown) may fetch or otherwise receive one or more blocks of texture 420 from cache 410, and the decompressing shader may determine the location and size of the compressed blocks from table 421. The size of a compressed block may be determined by calculating the difference between the starting physical addresses of two adjacent blocks. In other embodiments, additional data may be provided to indicate size and/or location information for blocks. Further, the decompression shader may obtain additional information from table 421, such as a DC coefficient value of each block.

In some embodiments, the texture may be organized according to superblocks. A superblock may be a set of 16 8×8 blocks, which is a tile of 32×32 pixels, for a total of 1024 pixels. The index table for the texture may include a table entry for each superblock, and each table entry may give the address of the start of each superblock. In one embodiment, this address may be the location of the superblock within the texture. In another embodiment, this address may be an offset from the start of the texture. Each entry may also include a 4-bit index of the first 8×8 block belonging to the superblock. In some embodiments, superblocks may not be aligned with 2 kilobit (Kb) boundaries of the cache. Each entry may also include a 16-bit mask. The 16-bit mask may include one bit per block indicating whether that block starts in the next 2 Kb word.

In some embodiments, the decompressing shader may transform the virtual address of the 8×8 block into the virtual address of a 32×32 superblock to calculate an entry number of the index table for lookup purposes. The decompressing shader may lookup the entry of the index table corresponding to the superblock. The index table may be processed by a shader in a similar manner as other textures. The entries of the index table may be cached and processed.

From each index table entry, the shader may obtain the base address, which may be a virtual address. The base address may be of the first fetch unit of the compressed superblock. The shader may also obtain the offset of the fetch unit containing the requested block which needs to be decompressed. The shader may also calculate if the block is compressed or not based on the address of the block. Certain address ranges may correspond to virtual addresses of uncompressed blocks, and other address ranges may correspond to physical addresses of compressed blocks. The shader may be able to distinguish between the different address ranges.

Figure 5:
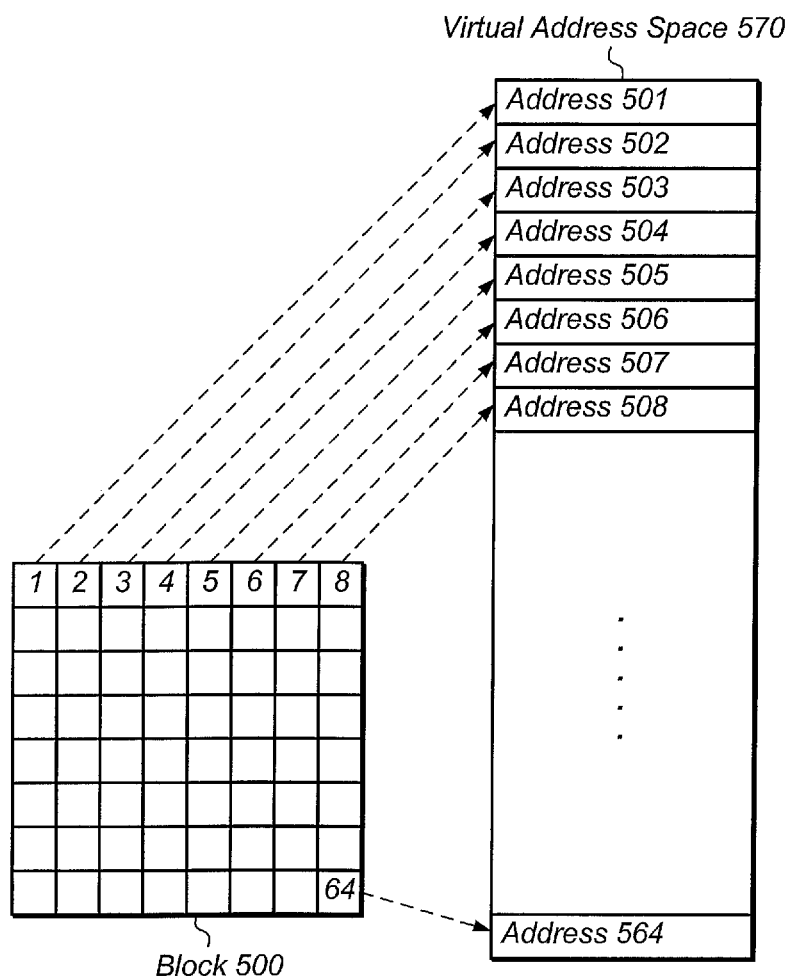
FIG. 5 illustrates one embodiment of a virtual address space for an 8×8 block of texels.

Referring now to FIG. 5, a block diagram of one embodiment of a virtual address space for an 8×8 block of texels is shown. Each texel may be mapped to a unique address within virtual address space 570. Texel 1 may be mapped to address 501, texel 2 may be mapped to address 502, and so on, for all 64 texels of 8×8 block 500. Block 500 may be a block within a compressed texture, and virtual address space 570 may be allocated for block 500 of the compressed texture. The texture may include a plurality of blocks in addition to block 500. Virtual address space 570 may also include a unique address for each texel of the plurality of blocks in the texture.

For purposes of illustration, it will be assumed that an uncompressed texel is a 32-bit value (4 sets of 8-bit values). Other sizes of uncompressed texels may also be utilized with the methods and mechanisms described herein. For example, an uncompressed texel with a 24-bit value may be handled in a similar way. In various embodiments, a texture consuming shader may generate requests for individual texels. First, the shader may compute the virtual address of a texel. Then, the cache may be queried for the virtual address corresponding to the texel.

Figure 6:
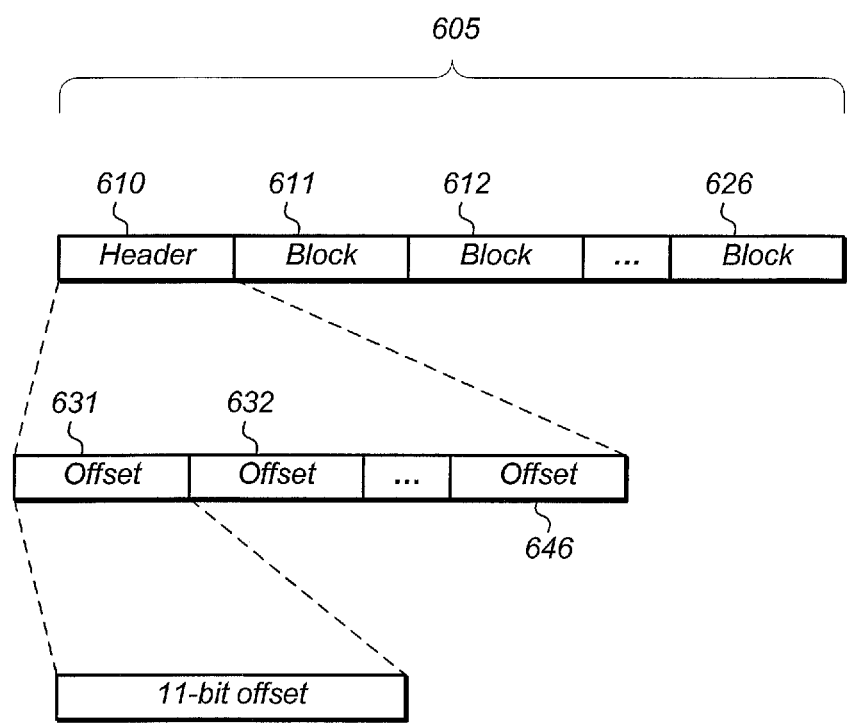
FIG. 6 is a block diagram of one embodiment of a portion of data.

Turning now to FIG. 6, a block diagram of one embodiment of compressed data is shown. Data portion 605 may be a unit of fetch of the compressed data, and the size of data portion 605 may be based on the size of an uncompressed block. In one embodiment, a fetch unit may be of size 2 Kb. In other embodiments, a fetch unit may be any of various sizes. A plurality of compressed blocks may be packed into a fetch unit. In one embodiment, the maximum number of blocks that may be packed into a fetch unit may be assumed to be 16. In other embodiments, other numbers of blocks may be packed into a fetch unit. For one type of cache access scheme, it may be assumed that the data of the blocks do not cross boundaries of fetch units.

A block may be the smallest decodable unit of a compression format, such as JPEG. For JPEG, the block is an 8×8 pixel tile (with 64 pixels). When a texture is compressed, and a block of the texture requested by a shader needs to be decompressed, a cache line may be allocated in the cache for the block. In one embodiment, the cache line size may be 2 Kb to store an entire uncompressed block (32 bits*64=2 Kb). In other embodiments, the cache line size may be any of various sizes.

If a fetch unit contains an uncompressed block, then only one block may fit in the fetch unit. For a fetch unit containing compressed blocks, the fetch unit may also include a 176-bit header. The fetch unit may be assumed to have a capacity of 16 blocks. The header may include 16 11-bit offset values to indicate the locations of the compressed blocks within the fetch unit. The offsets reference the starting bit positions of the blocks. In other embodiments, there may be a variable number of offset indicators in the header.

As shown in FIG. 6, data portion 605 may include header 610 and blocks 611-626. Blocks 611-626 may be sixteen different blocks of a compressed texture. Header 610 may include offsets 631-646. Each offset may be an 11-bit offset value corresponding to the location of the corresponding block within data portion 605. In other embodiments, other bit-sizes of offset values may be utilized. Offset 631 may represent the starting address of block 611, offset 632 may represent the starting address of block 612, and so on. In some embodiments, there may be an additional offset indicating the last bit of the last block, to reduce unnecessary fetch from the cache.

In some embodiments, compressed 8×8 blocks of the texture may be packed and cross fetch unit boundaries. The corresponding information, showing that the block uses two fetch units, may be stored in an index table, and a decompressing shader may generate two fetches instead of one for blocks that cross fetch unit boundaries.

Figure 7:
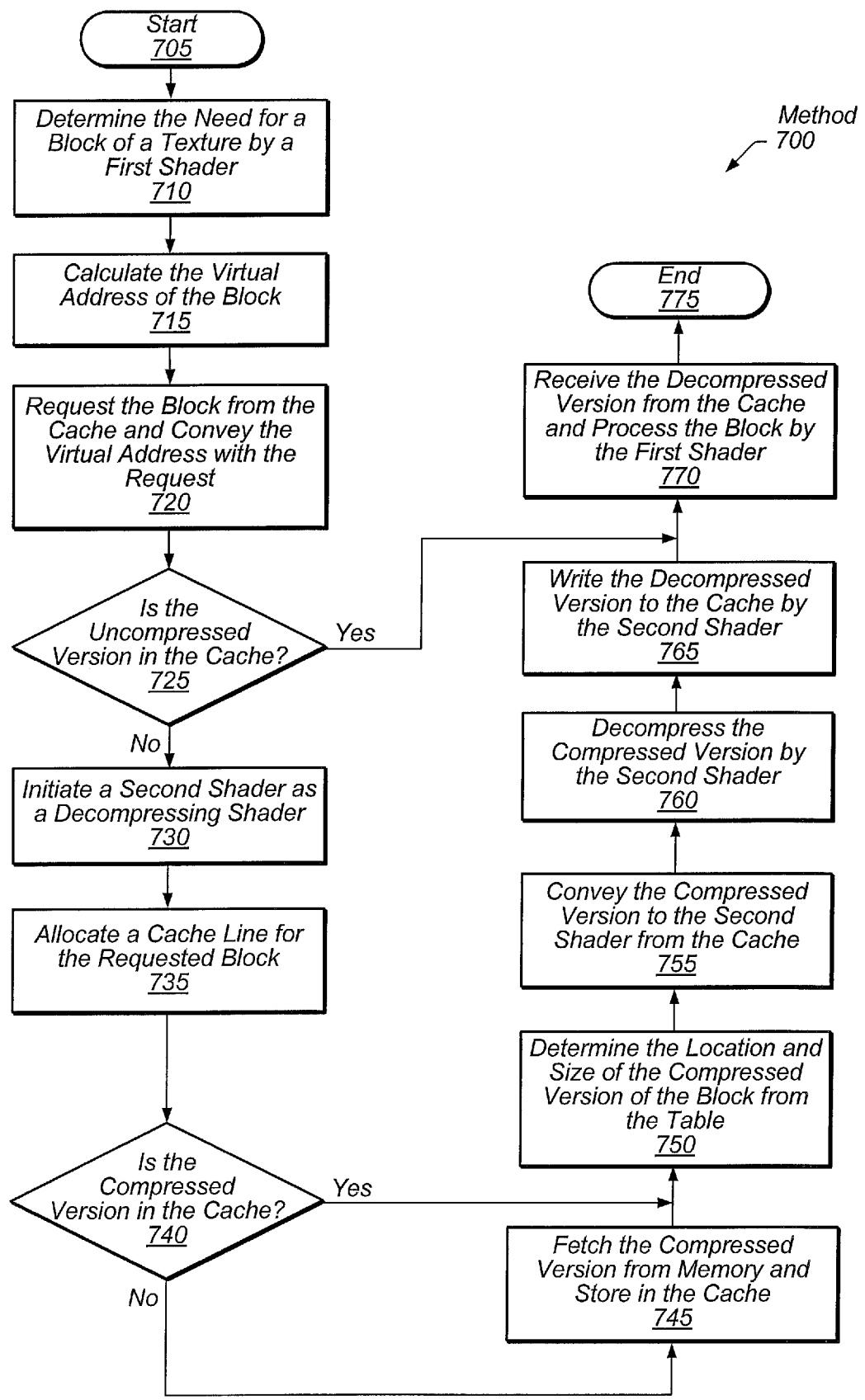
FIG. 7 is a generalized flow diagram illustrating one embodiment of a method to decompress a compressed block of a texture.

Turning now to FIG. 7, one embodiment of a method for decompressing a compressed block of a texture is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

The method 700 starts in block 705, and then in block 710, a first shader of a plurality of shaders may determine the need for a block of a texture as part of the rendering operations for an image. The first shader may be a texture consuming shader. Next, the first shader may calculate the virtual address of the block (block 715). The first shader may have an uncompressed view of the texture, corresponding to the uncompressed version of the texture, and the virtual address may correspond to the location of the requested block within the uncompressed view. After block 715, the first shader may request the block from the cache and convey the virtual address with the request (block 720). Next, the cache may determine if an uncompressed version of the block is stored in the cache (conditional block 725). If the uncompressed version of the block is stored in the cache, the first shader may receive the uncompressed version of the block from the cache and process the block (block 770).

If the uncompressed version of the block is not stored in the cache, a second shader of the plurality of shaders may be initiated as a decompressing shader (block 730). The resources for the decompressing shader may be pre-allocated on one or more shader processors to decrease the shader start latency and simplify resource management. Also, the virtual address of the requested block may be passed from the first shader to the second shader. Next, a cache line may be allocated for the requested block (block 735). Then, the cache may determine if a compressed version of the block is stored in the cache (conditional block 740). In various embodiments, the cache may make this determination in response to a request by the second shader for the compressed version of the block. In other embodiments, the cache may make this determination automatically in response to determining the uncompressed version of the block is not stored in the cache (conditional block 725).

If the compressed version of the block is stored in the cache (conditional block 740), then the cache and/or second shader may determine the location and size of the compressed version of the block from the table (block 750). If the compressed version of the block is not stored in the cache (conditional block 740), then the compressed version of the block may be fetched (e.g., from local or system memory) and stored in the cache (block 745). Fetching the compressed version of the block from system memory may entail fetching the entire compressed texture or some portion of the texture. The cache may be configured to utilize a table which maps the virtual address space of an uncompressed version of the texture to an address space of a compressed version of the texture. The cache and/or second shader may determine the location and size of the compressed version of the block from the table (block 750). The table may also contain additional information, such as the value of the DC coefficient of a compressed version of each block of the texture. After block 750, the compressed version of the block may be conveyed to the second shader from the cache (block 755).

In another embodiment, if the compressed version of the block is not in the cache (conditional block 740), steps 745, 750, and 755 may be replaced with alternate steps. In the alternate steps, the compressed version of the block may be fetched from system memory and provided directly to the second shader. These alternate steps may be more efficient than having the second shader receive the compressed version of the block from the cache. In a further embodiment, the compressed version of the block may be fetched from system memory and provided directly to the second shader while also being written to the cache.

After the second shader receives the compressed version of the block (block 755), the second shader may decompress the compressed version of the block (block 760). Next, the second shader may write the decompressed version of the block to the cache (block 765). Then, the first shader may receive the decompressed version of the block from the cache and process the block as part of the rendering operations for the current image (block 770). After block 770, the method may end in block 775. Method 700 may be repeated for a plurality of blocks from a plurality of textures.

Although the features and elements are described in the example embodiments in particular combinations, each feature or element can be used alone without the other features and elements of the example embodiments or in various combinations with or without other features and elements. The present invention may be implemented in a computer program or firmware tangibly embodied in a non-transitory computer-readable storage medium having machine readable instructions for execution by a machine, a processor, and/or any general purpose computer for use with or by any non-volatile memory device. The computer-readable storage medium may contain program instructions which are operable to enable the functions, methods, and operations described in this specification. Suitable processors include, by way of example, both general and special purpose processors.

Typically, a processor will receive instructions and data from a read only memory (ROM), a RAM, and/or a storage device having stored software or firmware. Storage devices suitable for embodying computer program instructions and data include all forms of non-volatile memory, including by way of example semiconductor memory devices, read only memories (ROMs), magnetic media such as internal hard disks and removable disks, magneto-optical media, and optical media such as CD-ROM disks and digital versatile disks (DVDs).

The above described embodiments may be designed in software using a hardware description language (HDL) such as Verilog or VHDL. The HDL-design may model the behavior of an electronic system, and the design may be synthesized and ultimately fabricated into a hardware device. In addition, the HDL-design may be stored in a computer product and loaded into a computer system prior to hardware manufacture.

Types of hardware components, processors, or machines which may be used by or in conjunction with the present invention include Application Specific Integrated Circuits (ASICs), Field Programmable Gate Arrays (FPGAs), microprocessors, or any integrated circuit. Such processors may be manufactured by configuring a manufacturing process using the results of processed hardware description language (HDL) instructions (such instructions capable of being stored on a computer readable media). The results of such processing may be maskworks that are then used in a semiconductor manufacturing process to manufacture a processor which implements aspects of the methods and mechanisms described herein.

Software instructions, such as those used to implement image rendering calculations and shader tasks, may be stored on a computer-readable storage medium. A computer-readable storage medium may include any mechanism for storing information in a form (e.g., software, processing application) readable by a machine (e.g., a computer). The computer-readable storage medium may include, but is not limited to, magnetic or optical media (e.g., disk (fixed or removable), tape, CD-ROM, DVD-ROM, CD-R, CD-RW, DVD-R, DVD-RW, or Blu-Ray), RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g. Flash memory) accessible via a peripheral interface such as the USB interface, micro-electro-mechanical systems (MEMS), and storage media accessible via a communication medium such as a network and/or a wireless link.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. An apparatus comprising:
a plurality of processing elements comprising circuitry configured to process data in parallel; and
circuitry configured to:
process a first graphics processing task by a first processing element of the plurality of processing elements, wherein the first graphics processing task processes a plurality of blocks of a texture to produce image data for a display device; and
based at least in part on a determination that multiple blocks of the plurality of blocks of the texture do not have an uncompressed version in the apparatus:
generate a vector by packing multiple decompression requests targeting the multiple blocks into the vector; and
process the multiple decompression requests by a second processing element of the plurality of processing elements.

2. The apparatus as recited in claim 1, wherein the vector is a single instruction multiple data (SIMD) vector.

3. The apparatus as recited in claim 1, wherein each of the multiple decompression requests of the vector is processed in parallel by multiple lanes of a plurality of lanes of the second processing element.

4. The apparatus as recited in claim 3, wherein prior to generating the vector, the circuitry is further configured to transcode a first compressed version of the multiple blocks to a second compressed version of the multiple blocks.

5. The apparatus as recited in claim 3, wherein, based at least in part on a determination that the second processing element has completed the multiple decompression requests, the circuitry is further configured to send the uncompressed version of the multiple blocks to the first processing element to complete the first graphics processing task.

6. The apparatus as recited in claim 4, wherein the circuitry is further configured to insert, in the multiple decompression requests when generating the vector, identification that specifies a storage location of the second compressed version of the multiple blocks.

7. The apparatus as recited in claim 1, wherein the apparatus is configured to:

maintain a first virtual address space for a compressed version of the texture; and maintain a second virtual address space different from the first virtual address space for an uncompressed version of the texture.

8. A method for decompressing texture data, the method comprising:
- processing, by circuitry of a processing unit, a first graphics processing task by a first processing element of a plurality of processing elements, wherein the first graphics processing task processes a plurality of blocks of a texture to produce image data for a display device; and
- based at least in part on a determination that multiple blocks of the plurality of blocks of the texture do not have an uncompressed version available:
  - generating a vector by packing multiple decompression requests targeting the multiple blocks into the vector; and
  - processing the multiple decompression requests by a second processing element of the plurality of processing elements.

9. The method as recited in claim 8, wherein the vector is a single instruction multiple data (SIMD) vector.

10. The method as recited in claim 8, wherein each of the multiple decompression requests of the vector is processed in parallel by multiple lanes of a plurality of lanes of the second processing element.

11. The method as recited in claim 10, wherein prior to generating the vector, the method further comprises transcoding a first compressed version of the multiple blocks to a second compressed version of the multiple blocks.

12. The method as recited in claim 11, further comprising inserting, in the multiple decompression requests when generating the vector, identification that specifies a storage location of the second compressed version of the multiple blocks.

13. The method as recited in claim 10, wherein, in response to determining that the second processing element has completed the multiple decompression requests, the method further comprises sending the uncompressed version of the multiple blocks to the first processing element to complete the first graphics processing task.

14. The method as recited in claim 13, further comprising:
- processing, by the second processing element, a second graphics processing task; and
- processing, by the first processing element, a vector comprising multiple decompression requests targeting multiple blocks of a texture of the second graphics processing task.

15. A computing system comprising:
a processing unit; and
a cache;
wherein the processing unit comprises:
- a plurality of processing elements configured to process data in parallel;
- circuitry configured to:
  - process a graphics processing task by a first processing element of the plurality of processing elements, wherein the graphics processing task processes a plurality of blocks of a texture to produce image data for a display device; and
  - based at least in part on a determination that multiple blocks of the plurality of blocks of the texture do not have an uncompressed version in the cache:
    - generate a vector by packing multiple decompression requests targeting the multiple blocks into the vector; and
    - process the multiple decompression requests by a second processing element of the plurality of processing elements.

16. The computing system as recited in claim 15, wherein the vector is a single instruction multiple data (SIMD) vector.

17. The computing system as recited in claim 15, wherein each of the multiple decompression requests of the vector is processed in parallel by multiple lanes of a plurality of lanes of the second processing element.

18. The computing system as recited in claim 17, wherein prior to generating the vector, the circuitry is further configured to transcode a first compressed version of the multiple data second compressed version of the multiple blocks.

19. The computing system as recited in claim 18, wherein the circuitry is further configured to insert, in the multiple decompression requests when generating the vector, identification that specifies a storage location of the second compressed version of the multiple blocks.

20. The computing system as recited in claim 17, wherein, based at least in part on a determination that the second processing element has completed the multiple decompression requests, the circuitry is further configured to send the uncompressed version of the multiple blocks to the first processing element to complete the graphics processing task.

* * * * *

UNITED STATES PATENT AND TRADEMARK OFFICE
CERTIFICATE OF CORRECTION

PATENT NO. : 12,080,032 B2
APPLICATION NO. : 17/352809
DATED : September 3, 2024
INVENTOR(S) : Iourcha et al.

Page 1 of 1

It is certified that error appears in the above-identified patent and that said Letters Patent is hereby corrected as shown below:

In the Claims

Column 16, Claim 18, Line 33-34, please delete "multiple data second compressed" and substitute -- multiple blocks to a second compressed --.

Signed and Sealed this
Eighteenth Day of March, 2025

Coke Morgan Stewart
*Acting Director of the United States Patent and Trademark Office*